United States Patent [19]
Tanaka et al.

[11] Patent Number: 5,557,385
[45] Date of Patent: Sep. 17, 1996

[54] METHOD AND DEVICE FOR CONTROLLING THERMAL FIXING MACHINE

[75] Inventors: Nobuyuki Tanaka, Kawasaki; Hironori Kanno, Inagi, both of Japan

[73] Assignee: Fujitsu Limited, Kawasaki, Japan

[21] Appl. No.: 268,038

[22] Filed: Jun. 29, 1994

[30] Foreign Application Priority Data

Oct. 15, 1993 [JP] Japan .................................. 5-258702

[51] Int. Cl.$^6$ ............................................ G03G 15/20
[52] U.S. Cl. ...................... 355/285; 219/216; 219/490; 355/204
[58] Field of Search ................................. 355/282, 285, 355/290, 289, 204, 208; 219/216, 497, 490, 494

[56] References Cited

U.S. PATENT DOCUMENTS

| | | | |
|---|---|---|---|
| 4,415,800 | 11/1983 | Dodge et al. | 219/497 |
| 4,551,007 | 11/1985 | Elter | 355/282 |
| 4,868,368 | 9/1989 | Araki | 219/216 |
| 5,140,132 | 8/1992 | Shiokawa | 219/216 |
| 5,278,394 | 1/1994 | Morino | 219/497 |

FOREIGN PATENT DOCUMENTS 59-92621  5/1984  Japan .

*Primary Examiner*—Thu Anh Dang
*Attorney, Agent, or Firm*—Armstrong, Westerman, Hattori, McLeland & Naughton

[57] ABSTRACT

The present invention relates to a method and device each for controlling the temperature of a thermal fixing machine where a toner image is fixed on a recording medium in a printer, a facsimile apparatus, or a copying machine using electrophotograpic technique. The object is to control the temperature, of a thermal fixing machine with high accuracy by increasing substantially a resolution of an A/D converter without increasing a device manufacturing cost, and reducing an effect on a temperature detection value due to noises. The system includes temperature detecting device for detecting the temperature of a thermal fixing machine as a digital value, sampling device for sampling plural temperature detection values detected with said temperature detecting device, and control device for subjecting a heater to an on/off control based on plural temperature detection values sampled by the sampling device.

26 Claims, 17 Drawing Sheets

METHOD AND DEVICE FOR CONTROLLING THERMAL FIXING MACHINE

BACKGROUND OF THE INVENTION

1) Field of the Invention

The present invention relates to a method and device each of which controls the temperature of a thermal fixing machine suitably used in printers, facsimile apparatuses, copying machines, or the like using an electrophotographic technique to fix an toner image onto a recording medium.

2) Description of the Related Art

An electrophotographic recording apparatus has been developed, that records an image by transferring a toner image of resin powder on a recording medium (for example, a recording paper), and melting to permeate thermally it into the recording medium so that the toner image is fixed on the recording medium.

The electrophotographic recording apparatus includes a thermal fixing machine which melts thermally a toner image of resin powder on a recording medium such as a sheet of paper to permeate it into the recording medium so that the toner image is fixed thereon.

FIG. 13 is a cross sectional view showing diagramatically the structure of a thermal fixing machine. Referring to FIG. 13, the thermal fixing machine includes a heat roller 111, a heater 112, a thermistor (temperature sensor) 113, a spring 114, a backup roller 115, and a separation pawl 116.

The heat roller 111 is formed of an aluminum pipe with a resin film such as Teflon (a trade name) coated over the external surface thereof, and a heater 112 arranged in the inner space of the aluminum pipe. The heater 112 heats the heater roller 111. The thermistor 113 is a variable resistor which varies its resistance with temperature. The thermistor 113 is arranged near to the heat roller 111 to detect the temperature of the heat roller 111.

The backup roller 115 is subjected to a bias force by the spring 114 to provide a constant pressure against the heat roller 111. A sheet of paper (recording medium) 120 passes between the backup roller 115 and the heat roller 111.

The separation pawl 116 peels the sheet 120 out of the heat roller 111.

When a sheet 120 with a toner image transferred thereon is introduced between the heat roller 111 and the backup roller 115, a toner image is fixed on the sheet 120 by applying heat from the heat roller 111 and the pressure of the backup roller 115.

A suitable amount of heat is needed to perform a toner heating by the thermal fixing machine. In other words, a thermal fixing machine in short of heat amount or at low temperature occurs the so-called cold offset in which a toner image is transferred on the roller 111 of the thermal fixing machine. By contraries, a thermal fixing machine heated excessively or at an excessive temperature occurs a hot offset in which toners melted stick to the heat roller 111.

Such a poor fixing or offset causes degraded image quality and a device contaminated. The thermal fixing machine at an excessively high temperature increases heat dissipation, thus causing ambient environmental deterioration and wasted power dissipation. Hence, the temperature of a thermal fixing machine should be controlled to the minimum.

In order to resolve the above demands, the control device shown in FIG. 14 generally controls a temperature heated by the heater 112 of a thermal fixing machine.

The control device is constituted of a heater 112 and a thermistor 113 shown in FIG. 13 in addition to resistors 101 to 103, a variable resistor 104, an operational amplifier 105, and a heater drive circuit 107.

The thermistor 113, corresponding to the thermistor 113 shown in FIG. 13, is a variable resistor which varies its resistance with temperature. The thermistor 113 produces a voltage corresponding to the temperature of the heat roller 111 to the operational amplifier 105.

A combination of the resistors 102 and 103 and the variable resistor 104 inputs a reference voltage to the operational amplifier 105. The reference voltage corresponds to a temperature (control target temperature ) to control a heating temperature of the thermal fixing machine.

Hence, the operational amplifier 105 compares a temperature of a heat roller 111 detected by the thermistor 113 with a reference temperature to output a voltage corresponding to its difference.

The heater drive circuit 107 receives an output (comparison result) from the operational amplifier 105 and subjects the heater 112 to an on/off drive control by supplying electric power to the heater when the heater is at less than a predetermined temperature or halting power supply to the heater when the heater is at more than a predetermined temperature. The heater drive cicuit 107 controls the temperature of the heat roller 111.

In order to cope with different suitable temperatures due to a change in use environment and record medium, the latest devices includes an A/D converter 121 and a CPU 122, instead of the resistors 102 to 104 and the operational amplifier 105 shown in FIG. 14, so that a predetermined temperature can be varied according to conditions, as shown in FIG. 15.

In the control device of a thermal fixing machine, shown in FIG. 15, the A/D converter 121 subjects temperature detection information (analog value) from the thermistor 113 to a digital conversion and the CPU 122 compares the digital value with a reference value (threshold), so that the heater 112 is on/off controlled.

In the CPU 122, a first threshold is set to subject the heater 112 to an on (lighting on) control and a second threshold larger than the first threshold is set to subject to an off (turning off) control. Hysteresis forming a difference between the first threshold for light-on control and the second threshold for light-off control prevents a heater chattering (a unstable factor shortening the operational life of a heater 112).

In the above configuration, the control device (CPU 122) of a thermal fixing machine shown in FIG. 15 operates in accordance with the flow chart shown in FIG. 16.

The A/D converter 121 subjects an analog voltage as a temperature detection information inputted from the thermistor 113 to an A/D conversion process. The CPU 122 samples digital values from the A/D converter 121 (step S1). The CPU 122 compares a sampled digital value with the first threshold (step S2).

In the step S2, when the digital value sampled is less than the first threshold, the CPU 122 outputs a control signal to the heater drive circuit 107 to subject the heater 112 to an on control (step S3) to sample the following digital value (step S1).

When it is judged that a sampled digital value has been equal to or more than the first reference value in the step S2, it is compared with the second threshold larger than the first threshold (step S4).

In the step S4, when it is judged that a digital value sampled is larger than the second threshold, the CPU 122 outputs a control signal to the heater drive circuit 107 to off-control the heater 112 to the previous control state (step 5), so that the following digital value sampling is performed (step S1).

Moreover, in the step S4, when it is judged that a digital value sampled is equal to or smaller than the second threshold (a digital value sampled is between the first threshold and the second threshold), the CPU 122 outputs a control signal to the heater drive circuit 107 to maintain the condition of the heater 112 in the previous state (step S6), thus sampling the next digital value (step S1).

However, in the prior art control means for a thermal fixing machine, a temperature sensor such as the thermistor 113 has a non-linear characteristic to variations in temperature shown in FIG. 17. The temperature sensor is required to detect a wide detection region ranging from a room temperature to about 140° C. of a fixing temperature. Consequently, when only the temperature sensor is used to detect the wide detection region, it is not always used over higher resolution regions of the A/D converter 121. Therefore, there is a problem that the low detection accuracy of a temperature sensor which controls a fixing temperature varies its temperature control value.

For example, as shown in FIG. 17, since a voltage variation as a detection value to a temperature variation is large over temperatures ranging from a room temperature to about 100° C., the A/D converter 121 can accurately detect a digital value as a temperature detection value. However, a small voltage variation as a detection value to a temperature variation in the vicinity of a fixing temperature of about 140° C. makes low the accuracy of the A/D converter 121, whereby the accuracy of a temperature detection value to control the fixing temperature becomes lower.

Since the least significant bit of the A/D converter 121 is very unstable, the hysteresis width between the thresholds of heater on/off operation points which is decided to prevent a heater chattering becomes small, thus resulting in a large temperature variation.

Moreover, in order to improve a detection accuracy to a required detection temperature region, using different circuits over different detection temperature ranges or an A/D converter with higher resolution boosts the device manufacturing cost.

SUMMARY OF THE INVENTION

The present invention is made to overcome the above mentioned problems. An object of the present invention is to provide a method for controlling the temperature of a thermal fixing machine with high accuracy by increasing substantially a resolution of an A/D converter without increasing a device manufacturing cost, and reducing an effect on a temperature detection value due to noises.

Another object of the present invention is to provide a device for controlling the temperature of a thermal fixing machine with high accuracy by increasing substantially a resolution of an A/D converter without increasing a device manufacturing cost, and reducing an effect on a temperature detection value due to noises.

In order to achieve the above objects, according to the present invention, the method for controlling a thermal fixing machine at a temperature wherein a toner image transferred on a recording medium is heated and melted by means of a heater to fix the toner image on the recording medium, is characterized by the steps of detecting a temperature of the thermal fixing machine as a digital value; sampling plural temperature detection values; and subjecting the heater to an on/off control based on the plural temperature detection values sampled.

According to the present invention, the thermal fixing machine controlling method is further characterized by the steps of comparing the plural temperature detection values with a predetermined temperature, respectively; calculating data number of temperature detection values at a predetermined temperature or more among the plural temperature detection values; comparing the data number with a predetermined threshold; and subjecting the heater to an on/off control based on the above comparison result.

According to the present invention, the thermal fixing machine controlling method is further characterized by the steps of setting as the predetermined threshold a first threshold and a second threshold equal to or larger than the first threshold; comparing the data number with the first threshold and the second threshold, respectively; subjecting the heater to an on control when the data number is equal to or smaller than the first threshold; and subjecting the heater to an off control when the data number is equal to or larger than the second threshold.

According to the present invention, the thermal fixing machine controlling method is further characterized by the step of maintaining an on/off control state of the heater when the data number is between the first threshold and the second threshold.

Moreover, according to the present invention, the thermal fixing machine controlling method is further characterized by the steps of comparing the plural temperature detection values with a predetermined temperature, respectively; calculating data number of a temperature detection value equal to or lower than the predetermined temperature; comparing the data number with a predetermined threshold; and subjecting the heater to an on/off control based on the above result.

According to the present invention, the thermal fixing machine controlling method is further characterized by the steps of setting as the predetermined threshold a first threshold and a second threshold equal to or lower than the first threshold; comparing the data number with the first threshold and the second threshold, respectively; subjecting the heater to an on control when the data number is equal to or larger than the first threshold; and subjecting the heater to an off control when the data number is equal to or smaller than the second threshold.

Furthermore, according to the present invention, the thermal fixing machine controlling method is further characterized by comprising the step of maintaining an on/off control state of said heater when said data number is between said first threshold and said second threshold.

According to the present invention, the thermal fixing machine controlling method is further characterized by the step of calculating a total sum of the plural temperature detection values; comparing the total sum with a predetermined threshold; and subjecting the heater to an on/off control based on the comparison result.

Furthermore, according to the present invention, the thermal fixing machine controlling method is further characterized by the steps of setting as the predetermined threshold a first threshold and a second threshold equal to or larger than the first threshold; comparing the total sum with the first threshold and the second threshold, respectively; subjecting the heater to an on control when the total sum is equal to or smaller than the first threshold; and subjecting the heater to an off control when the total sum is equal to or larger than the second threshold.

According to the present invention, the thermal fixing machine controlling method is further characterized by the step of maintaining an on/off control state of the heater when the total sum is between the first threshold and the second threshold.

Moreover, according to the present invention, the thermal fixing machine controlling method is further characterized by the step of subjecting the heater to an on/off control based on temperature detection values other than at least one temperature detection value in decreasing order from the largest one among the plural temperature detection values.

According to the present invention, the thermal fixing machine controlling method is further characterized by the step of subjecting the heater to an on/off control based on temperature detection values other than at least one temperature detection value in increasing order from the smallest one among the plural temperature detection values.

Furthermore, according to the present invention, the device for controlling a thermal fixing machine at a temperature wherein a toner image transferred on a recording medium is heated and melted by means of a heater to fix the toner image on the recording medium, is characterized by temperature detecting means for detecting a temperature of the thermal fixing machine as a digital value; sampling means for sampling plural temperature detection values detected by the temperature detecting means; and control means for subjecting the heater to an on/off control based on the plural temperature detection values sampled by the sampling means.

According to the present invention, the thermal fixing machine controlling device is further characterized by temperature comparing means for comparing the plural temperature detection values with a predetermined temperature, respectively; counting means for calculating data number of temperature detection values at a predetermined temperature or more based on the result compared by the temperature comparing means; and data number comparing means for comparing a data number counted by the counting means with a predetermined threshold; whereby the control means subjects the heater to an on/off control based on the above comparison result from the data number comparing means.

Furthermore, according to the present invention, the data number comparing means is formed of first comparing means for comparing the data number with a first threshold as the predetermined threshold; and second comparing means for comparing the data number with the second threshold equal to or larger than the first threshold as the predetermined threshold; whereby the control means subjects the heater to an on control when the first comparing means judges that the data number is equal to or smaller than the first threshold; and the second comparing means subjects the heater to an off control when the data number is equal to or larger than the second threshold.

According to the present invention, the thermal fixing machine controlling device, the control means maintains an on/off control state of the heater when the first comparing means and the second comparing means judge that the data number is between the first threshold and the second threshold.

A thermal fixing machine controlling device according to the present invention is further characterized by temperature comparing means for comparing the plural temperature detection values with a predetermined temperature, respectively; counting means for calculating data number of temperature detection values at a predetermined temperature or less based on the comparison result from the temperature comparing means; and data number comparing means for comparing a data number counted by the counting means with the predetermined data threshold value; whereby the control means subjects the heater to an on/off control based on the above comparison result from the data number comparing means.

According to the thermal fixing machine controlling device of the present invention, the data number comparing means is characterized by first comparing means for comparing the data number with a first threshold as the predetermined threshold; and second comparing means for comparing the data number with the second threshold equal to or less than the first threshold as the predetermined threshold; whereby said control means subjects said heater to an on control when the first comparing means judges that the data number is equal to or smaller than the first threshold; and the second comparing means subjects the heater to an off control when the data number is equal to or smaller than the second threshold.

According to the thermal fixing machine controlling device of the invention, the control means maintains an on/off control state of the heater when the first comparing means and the second comparing means judge that the data number is between the first threshold and the second threshold.

The thermal fixing machine controlling device according to the present invention is further characterized by total sum calculating means for calculating a total sum of the plural temperature detection values; and total sum comparing means for comparing the total sum with a predetermined threshold; whereby the control means subjects the heater to an on/off control based on the above comparison result from the total sum comparing means.

According to the thermal fixing machine controlling device according to the present invention, the total sum comparing means is characterized by first comparing means for comparing the total sum with a first threshold as a predetermined threshold; and second comparing means for comparing the total sum with the second threshold equal to or larger than the first threshold as the predetermined threshold; whereby the control means subjects the heater to an on control when the first comparing means judges that the total sum is equal to or smaller than the first threshold, and the control means subjects the heater to an off control when the second comparing means judges that the total sum is equal to or larger than the second threshold.

According to the thermal fixing machine controlling device according to the present invention, the control means maintains an on/off control state of the heater when both the first comparing means and the second comparing means judge that the total sum is between the first threshold and the second threshold.

A thermal fixing machine controlling device according to the present invention is further characterized by deleting means for deleting at least one temperature detection value in decreasing order from the maximum one among the plural temperature detection values sampled by the sampling means.

The thermal fixing machine controlling device according to the present invention is further characterized by deleting means for deleting at least one temperature detection value in increasing order from the minimum one among the plural temperature detection values sampled by the sampling means.

As described above, the thermal fixing machine control method and the thermal fixing machine control device of the present invention provide the following effects and advantages.

Since a heater temperature detection is easily done with high accuracy based on plural temperature detection values, the heater can be subjected to an on/off control with a substantially improved resolution of an A/D converter, without increasing a device manufacturing cost. As a result, a toner image can be fixed at a more suitable temperature to form a good image.

Controlling the temperature of a fixing machine with higher accuracy leads to a small hysteresis width to prevent chattering at a heater on/off control operation, so that the temperature variations can be reduced sufficiently.

Since the maximum and minimum ones among sampled temperature detection values are deleted, an abnormal data output from an A/D converter due to noises invading circuitry can be removed to reduce an effect due to noise interference.

DESCRIPTION OF THE PREFERRED EMBODIMENTS

Referring to the attached drawings, explanation will be made in detail as for preferred embodiments according to the present invention.

(a) The aspect of the invention:

Next, explanation will be made below as for an aspect of the present invention.

Figure 1:
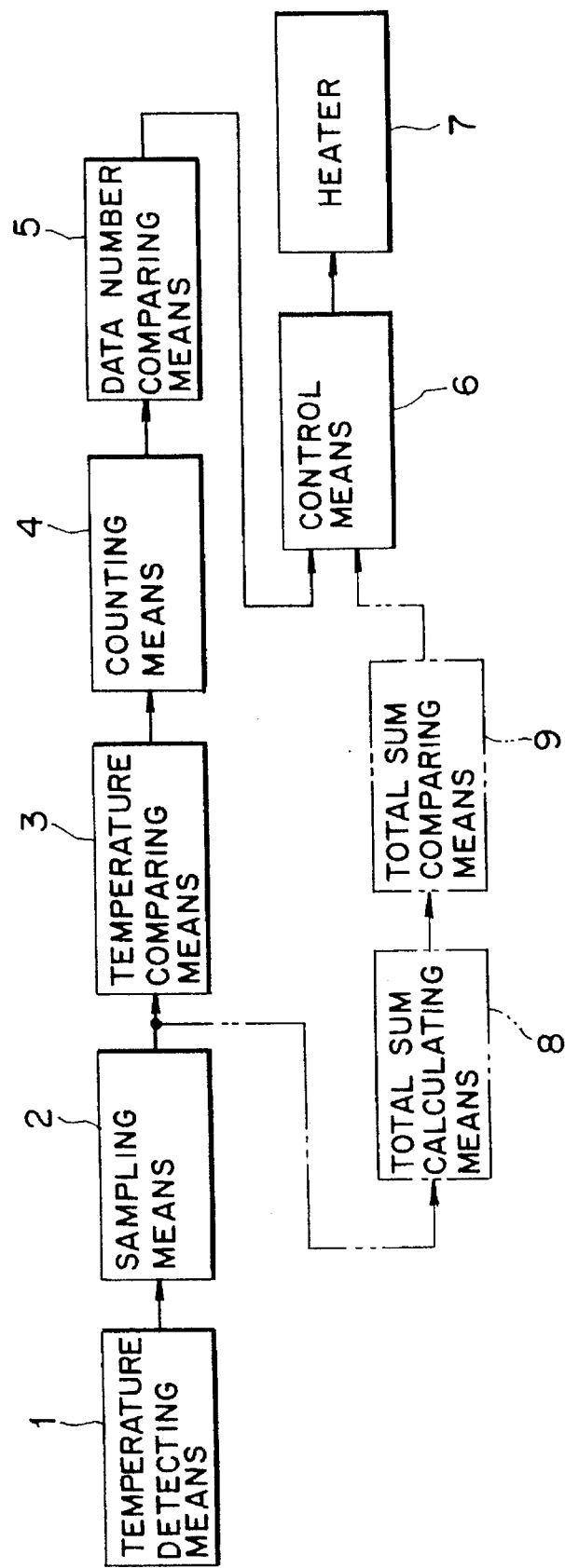
FIG. 1 is a block diagram showing an aspect of the present invention.

FIG. 1 is a block diagram showing an aspect of the present invention. Referring to FIG. 1, temperature detecting means 1 detects the temperature of a thermal fixing machine as a digital value. Sampling means 2 samples plural temperature detection values detected by the temperature detecting means 1.

Temperature comparing means 3 compares plural temperature detection values sampled by the sampling means 2 with a predetermined temperature, respectively. Counting means 4 counts data number of a temperature detection value equal to or higher than a predetermined temperature in accordance with a comparison result from the temperature comparing means 3.

Data number comparing means 5 compares data number counted by the counting means 4 with a predetermined threshold. The data number comparing means 5 includes first comparing means for comparing data number with a first threshold as a predetermined threshold, and second comparing means for comparing data number with a second threshold equal to or larger than the first threshold.

Control means 6 controls an on/off state of the heater 7 in accordance with a comparison result from the data number comparing means 5. The control means 6 subjects the heater 7 to an on control when the first comparing means in the data number comparing means 5 judges that data number is equal to or smaller than the first threshold, and subjects the heater 7 to an off control when the second comparing means in the data number comparing means 5 judges that data number is equal to or larger than the second threshold.

When the first and second comparing means in the data number comparing means 5 judge that the data number is between the first threshold and the second threshold, the control means 6 sustains the on/off state of the heater 7.

Each of the counting means 4, the data number comparing means 5 and the control means 6 can be constituted as follows:

The counting means 4 may count a data number of a temperature detection value equal to or lower than a predetermined temperature based on a comparison result from the temperature comparing means 3. The data number comparing means 5 is formed of first comparing means for comparing a data number counted by the counting means 4 with a first threshold as a predetermined threshold, and a second comparing means for comparing a data number with a second threshold equal to or less than the first threshold.

The control means 6 subjects the heater 7 to an on control when the first comparing means in the temperature comparing means 5 judges that the data number is equal to or more than the first threshold, and subjects the heater 7 to an off control when the second comparing means in the temperature comparing means 5 judges that the data number is equal to or less than the second threshold.

When the first and second comparing means in the temperature comparing means 5 judge that a data number is between the first threshold and the second threshold, the control means 6 sustains the on/off control state of the heater 7.

According to the present invention, both total sum calculating means 8 and total sum comparing means 9 may be arranged instead of the temperature comparing means 3, the counting means 4, and the data number comparing means 5.

The total sum calculating means 8 calculates a total sum of plural temperature detection values sampled by the sampling means 2. The total sum comparing means 9 compares a total sum calculated by the total sum calculating means 8 with a predetermined threshold. The total sum comparing means includes first comparing means for comparing the first threshold as a predetermined threshold and second comparing means for comparing the total sum with the second threshold larger than the first threshold.

The control means 6 controls an on/off control of the heater 7 in accordance with the comparison result from the total sum comparing means 9. The control means 6 subjects the heater 7 to an on control when the first comparing means in the total sun comparing means 9 judges that the total sum is equal to or less than the first threshold, and subjects the heater 7 to an off control when the second comparing means in the total sum comparing means 9 judges that the total sum is equal to or larger than the second threshold.

When the first and second comparing means in the total sum comparing means 9 judge that the total sum is between the first threshold and the second threshold, the control means 6 maintains the on/off state of the heater 7.

According to the present invention, deleting means may be arranged to delete at least one temperature detection value in a decreasing order from the maximum value among plural temperature detection values sampled by the sampling means 2. Deleting means may be arranged to delete at least one temperature detection value in an increasing order from the minimum value among plural temperature detection values sampled by the sampling means 2.

Figure 17:
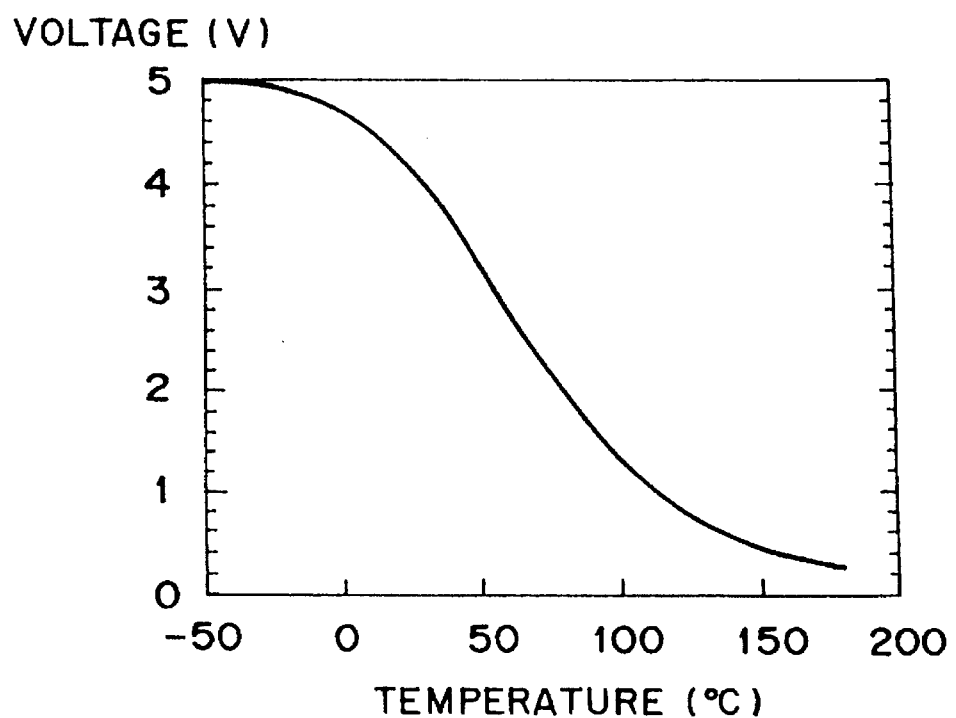
FIG. 17 is a diagram showing a temperature versus voltage output characteristic of a thermistor.

As shown in FIG. 17, in the case where the relationships in value between temperature and voltage is reversed in a circuit configuration, the same operation can be performed by reversing the relationships in value of the output from the A/D converter used for an actual calculation.

In order to avoid confusion, temperature detection values will be explained below as temperature values.

The temperature detecting means 1 detects the temperature of the thermal fixing machine as a digital value. The sampling means 2 samples plural temperature detection values from the temperature detecting means 1.

The temperature comparing means 3 compares plural temperature detection values sampled with a predetermined temperature, respectively. The counting means 4 counts a data number of a temperature detection value equal to or higher than a predetermined temperature.

The first comparing means in the data number comparing means 5 compares a data number calculated by the counting means 4 with the first threshold. The second comparing means in the data number comparing means 5 compares the data number with the second threshold equal to or more than the first threshold.

The control means 6 subjects the heater 7 to an on control when the data number is equal to or less than the first threshold, and subjects the heater 7 to an off control when the data number is equal to or more than the second threshold. Moreover, when the data number is between the first threshold and the second threshold, the on/off control of the heater 7 is maintained.

According to the present invention, the temperature comparing means 3 may compare plural temperature detection values sampled with a predetermined temperature, respectively. The counting means 4 counts a data number of a temperature detection value equal to or less than a predetermined temperature.

In this case, the first comparing means in the data number comparing means 5 compares a data number calculated by the counting means 4 with the first threshold. The second comparing means in the data number comparing means compares the data number with the second threshold equal to or more than the first threshold. The control means 6 subjects the heater 7 to an on control when the data number is equal to or more than the first threshold, or subjects the ehater 7 to an off control when the data number is equal to or less than the second threshold. When the data number is between the first threshold and the second threshold, the control means 6 of the heater 7 is maintained in an on/off control state.

In the case where both the total sum calculating means 8 and the total sum comparing means 9 are arranged instead of the temperature comparing means 3, the counting means 4 and the data number comparing means 5, the total sum calculating means 8 calculates a total sum of plural temperature detection values sampled by the sampling mans 2. The first comparing means in the total sum comparing means 9 compares the total sum of temperature detection values from the total sum calculating means 8 with the first threshold. The second comparing means in the total sum comparing means 9 compares the total sum with the second threshold equal to or more than the first threshold.

The control means 6 subjects the heater 7 to an on control when the total sum is equal to or less than the first threshold, and subjects it to an off control when the total sum is equal to or more than the second threshold. When the total sum is between the first threshold and the second threshold, the control means 6 sustains the on/off control state of the heater 7.

According to the present invention, an actual temperature is mathematically judged by calculating the tendency in value (data number) to a predetermined temperature or a total sum based on plural temperature detection values so that the heater 7 can be on/off controlled.

According to the present invention, the deleting means deletes at least one temperature detection value in decreasing order from the maximum value, or at least one temperature detection value in increasing order from the minimum value. Thus an on/off control of the heater 7 based on the temperature detection value can prevent the temperature detection value from being interfered by noises.

As described above, the thermal fixing machine control method and thermal fixing machine control device of the present invention provide the following effects and advantages.

Since a heater temperature detection is easily done with high accuracy based on plural temperature detection values, the heater 7 can be subjected to an on/off control with a substantially improved resolution of an A/D converter, without increasing the device manufactring cost. As a result, a toner image can be fixed at a more suitable temperature to form a good image.

Controlling the temperature of a fixing machine with higher accuracy leads to a small hysteresis width to prevent chattering at a heater on/off control operation, so that the temperature variation can be reduced sufficiently.

Since the maximum and minimum ones among sampled temperature detection values are deleted, an abnormal data output from an A/D converter due to noises induced in circuitry can be removed to reduce an effect due to noise interference.

Figure 2:
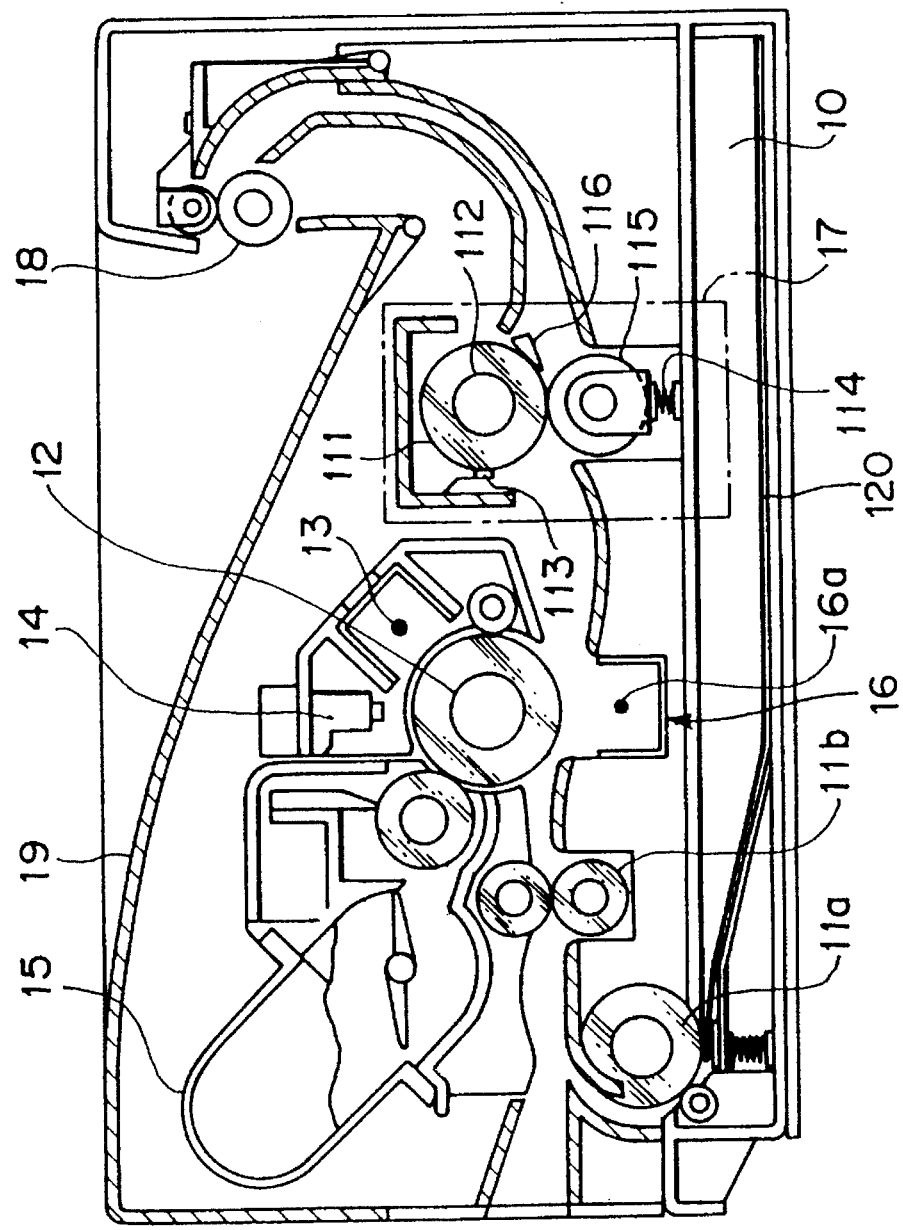
FIG. 2 is a side cross-sectional view showing a general structure of an electrophotographic recording apparatus employing the present invention.

(b) Explanation of First Embodiment:

FIG. 2 is a side cross-sectional view showing a general structure of an electrophotographic recording apparatus employing the first embodiment of the present invention. In FIG. 2, a paper cassette 10 stores sheets of paper (sheet 120) as recording medium. Sheets 120 of paper stored in the paper cassette 10 are taken out with a pickup roller 11a one by one.

A photosensitive drum 12 formed of an aluminum pipe has its outer surface on which a function separation-type organic photosensitive material is coated. Numeral 13 is a pre-electrostatic charger which charges electrostatically and uniformly the surface of the photosensitive drum 12. For example, a non-contact-type electrostatic charger constituted of Scorotrons is used as an electrostatic charger to charge electrostatically the surface of the photosensitive drum 12 at 600 volts.

An LED optical system 14 exposes the photosensitive drum 12 charged uniformly with the front electrostatic charger 13 in accordance with an image pattern to form an electrostatic latent image. The LED optical system 14 is formed of an LED array and a SELFOC array. The photosensitive drum 12 is charged at −600 volts to form a latent image at a voltage of −500 to −100 volts.

A developer 15 supplies charged toner powders onto the electrostatic latent image formed on the photosensitive drum 12 with the LED optical system 14. Since the toner powders are stuck on the photosensitive drum, the electrostatic latent image becomes visible.

The photoresist roller 11b arranges in order the end of a sheet 120 of paper taken out of the paper cassette 10 using the pickup roller 11a to feed it between the photosensitive drum 12 and the transfer device 16.

The transfer device 16, which transfers a toner image on the photosensitive drum 12 electrostatically onto a sheet 120 of paper, is formed of, for example, a corona discharger. That is, a voltage of +3 kV to +10 kV is applied on a corona wire 16a to produce electric charges by a corona discharge. Since the back surface of the sheet 120 of paper is electrostatically charged, a toner image on the photosensitive drum 12 is transferred by a voltage difference between the sheet 120 of paper and the drum 12.

Figure 13:
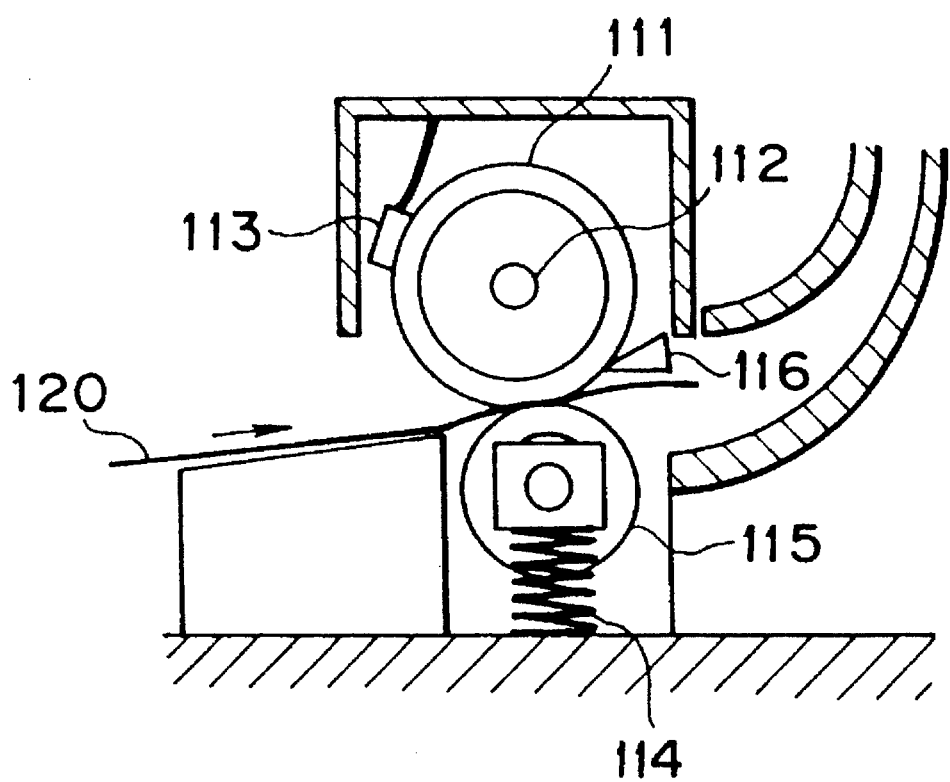
FIG. 13 is a side sectional view diagramatically showing the structure, of a general thermal fixing machine.

The thermal fixing machine 17, which fixes thermally a toner image stuck on the sheet 120 of paper, has the same structure as that shown in FIG. 13. That is, the fixing machine 17 includes a heat roller 111, a heater 112, a thermistor 113, a spring 14, a backup roller 115, and a separation pawl 116.

Figure 3:
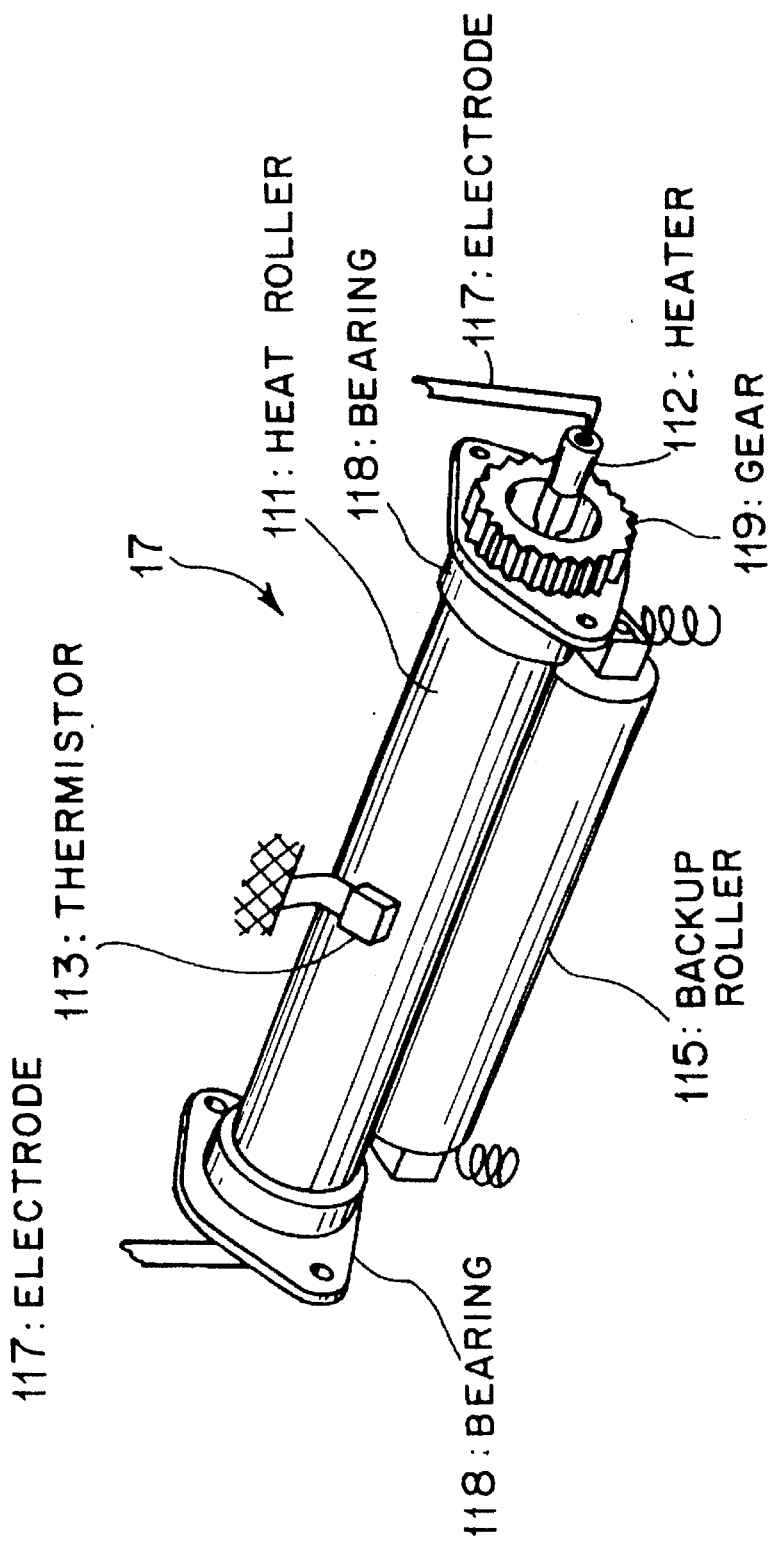
FIG. 3 is a perspective view diagramatically showing a structure of a thermal fixing machine.

FIG. 3 is a perspective view schematically showing the thermal fixing machine 17. Referring to FIG. 3, the thermistor 113 is arranged adjacent to the surface of the heat roller 111 and axially in the central portion of the heat roller 111. The thermistor 113 can detects an electrical signal (voltage value) corresponding to the surface temperature of the heat roller 111.

Electrodes 117 are connected to the ends of the heater 112 built in the heat roller 111 to supply electric power so that the heat roller 111 is heated through heat dissipation from the heater 112. The electric power to the heater 112 is controlled through an on/off control of the control device (CPUs 21a to 21d) (to be described later) for the thermal fixing machine.

In FIG. 3, numeral 118 is a bearing axially supporting the ends of the heat roller 111 and 119 is a gear securely fixed to the end of the heat roller. The rotational drive force from a drive system (not shown) is transferred to the gear 119 to rotate the heat roller 111.

In FIG. 2, numeral 18 represents a paper eject roller for ejecting a sheet 120 on which a toner image is fixed with the thermal fixing machine 17, and 19 represents a stacker which receives sheets ejected out of the paper eject roller 18 after a printing completion.

A toner image is transferred on a sheet 120 stored in the paper cassette 10 under the linking operation of the photosensitive drum 12, the electrostatic charger 13, the LED optical system 14, the developer 15 and the transferring device 16. After the thermal fixing machine 17 transfers a toner image onto a sheet of paper, the paper eject roller 18 ejects it into the stacker 19. The thermal fixing machine 17 is controlled by the control device shown in FIG. 4.

Figure 4:
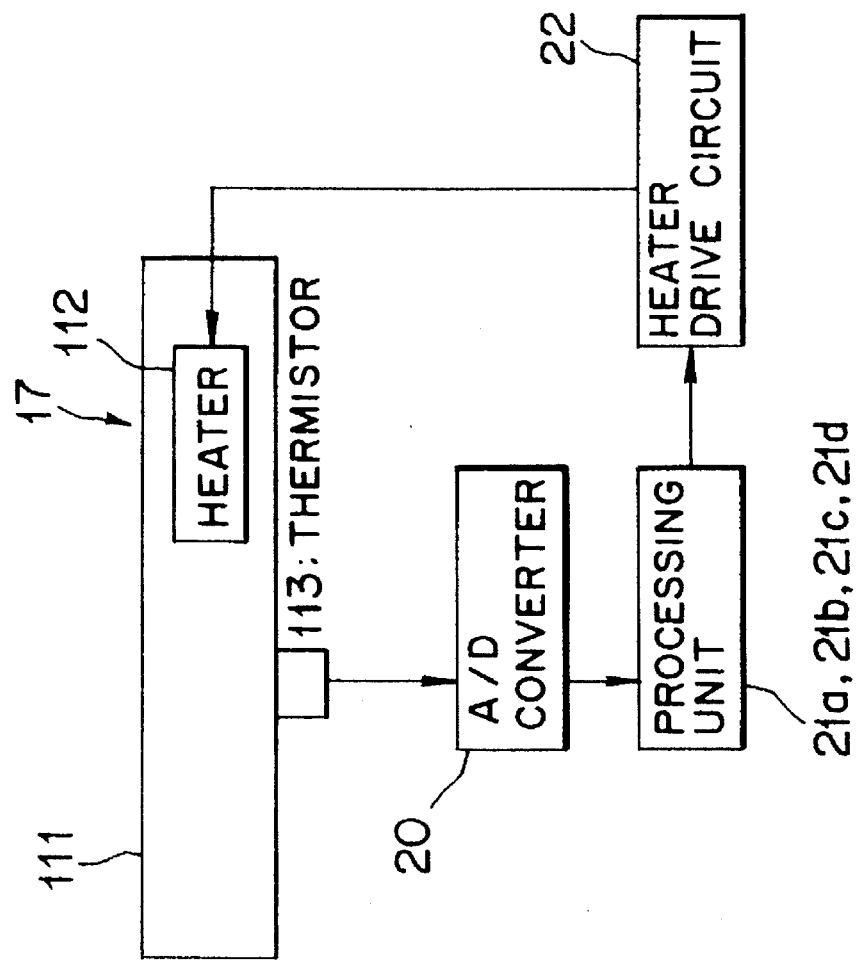
FIG. 4 is a block diagram showing a general structure of a control device for a thermal fixing machine according to the present invention.
Figure 15:
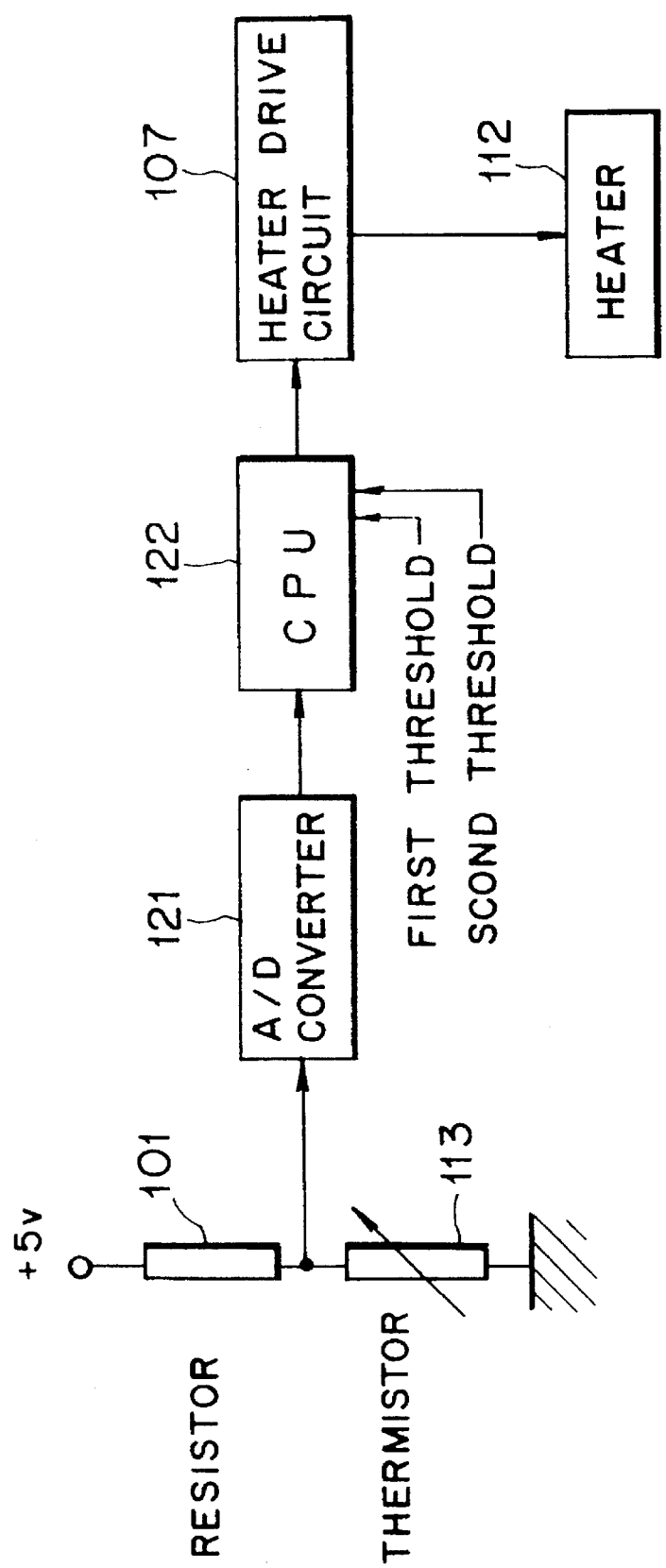
FIG. 15 is a block diagram showing a second example of a control device for a general thermal fixing machine.
Figure 16:
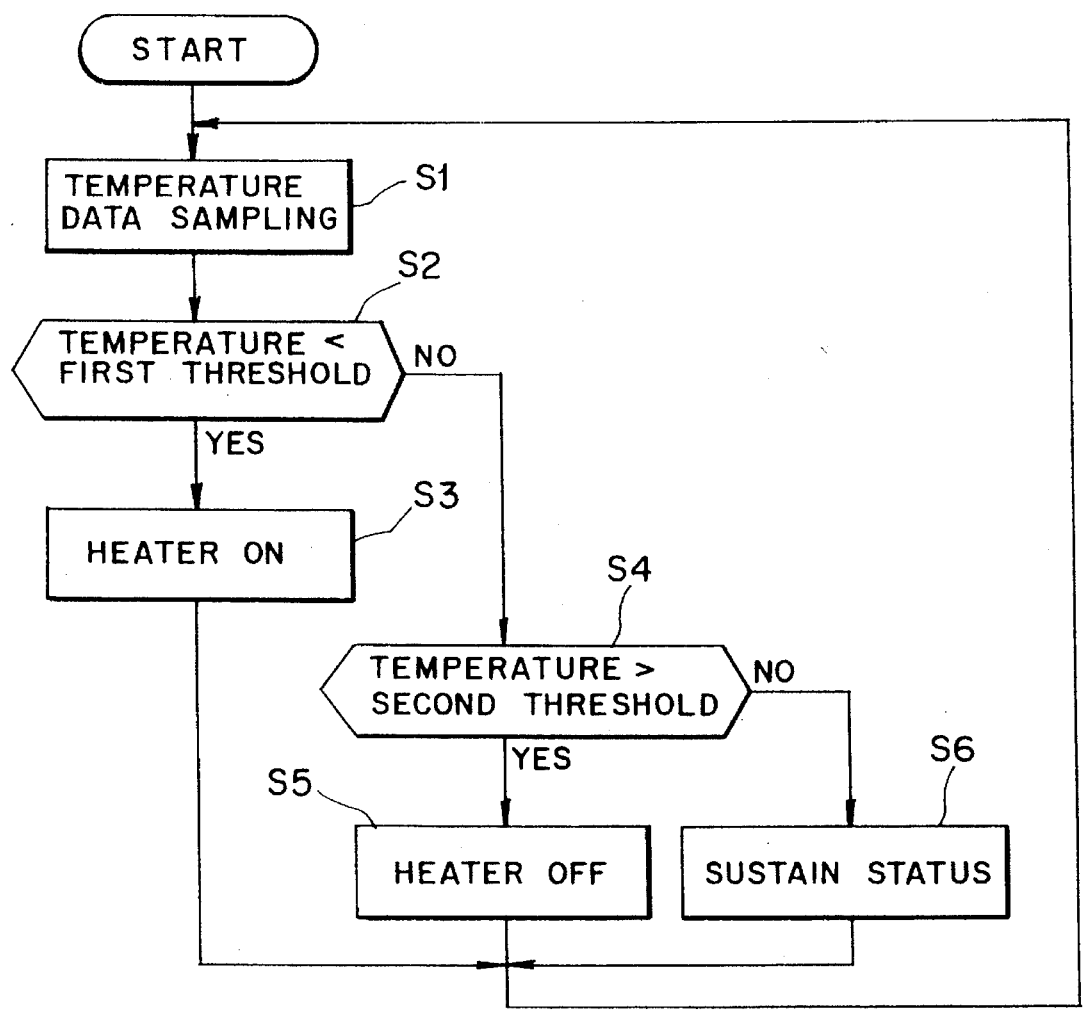
FIG. 16 is a flow chart used for explaining an operation of the second embodiment of a control device for a general thermal fixing machine.

The thermistor 113, shown in FIG. 4, is a resistor of which its resistance value varies with temperature. Like the thermistor shown in FIG. 15, the thermistor 113 has one end connected to a potential of +5 volt via a resistor of 10 kilo ohms (refer to numeral 101 in FIG. 15) and the other end grounded. The thermistor 113 varies its resistance value with a temperature of the heat roller 111 to produce a voltage signal (analog signal) corresponding to the temperature of the heat roller 111.

An A/D converter 20 subjects temperature detection information (analog voltage value) of the heat roller 111 from the thermistor 113 to an A/D conversion to output it as a digital value.

Both the thermistor 113 and the A/D converter 20 form temperature detecting means which detects the temperature of the thermal fixing machine 17 as a digital value.

Numerals 21a, 21b, 21c and 21d represent CPUs each corresponding to that in the first to fourth embodiments according to the present invention. Each of the CPUs 21a, 21b, 21c and 21d requests data from the A/D converter 20, for example, every 15 milliseconds, samples plural temperature detection values (for example, N or N+2) each regarding a digital signal from the A/D converter 20, and subjects the heater 112 to an on/off control based on plural temperature detection values sampled. As described later, each CPU is constituted as shown in FIGS. 5, 7, 9, and 11.

Figure 14:
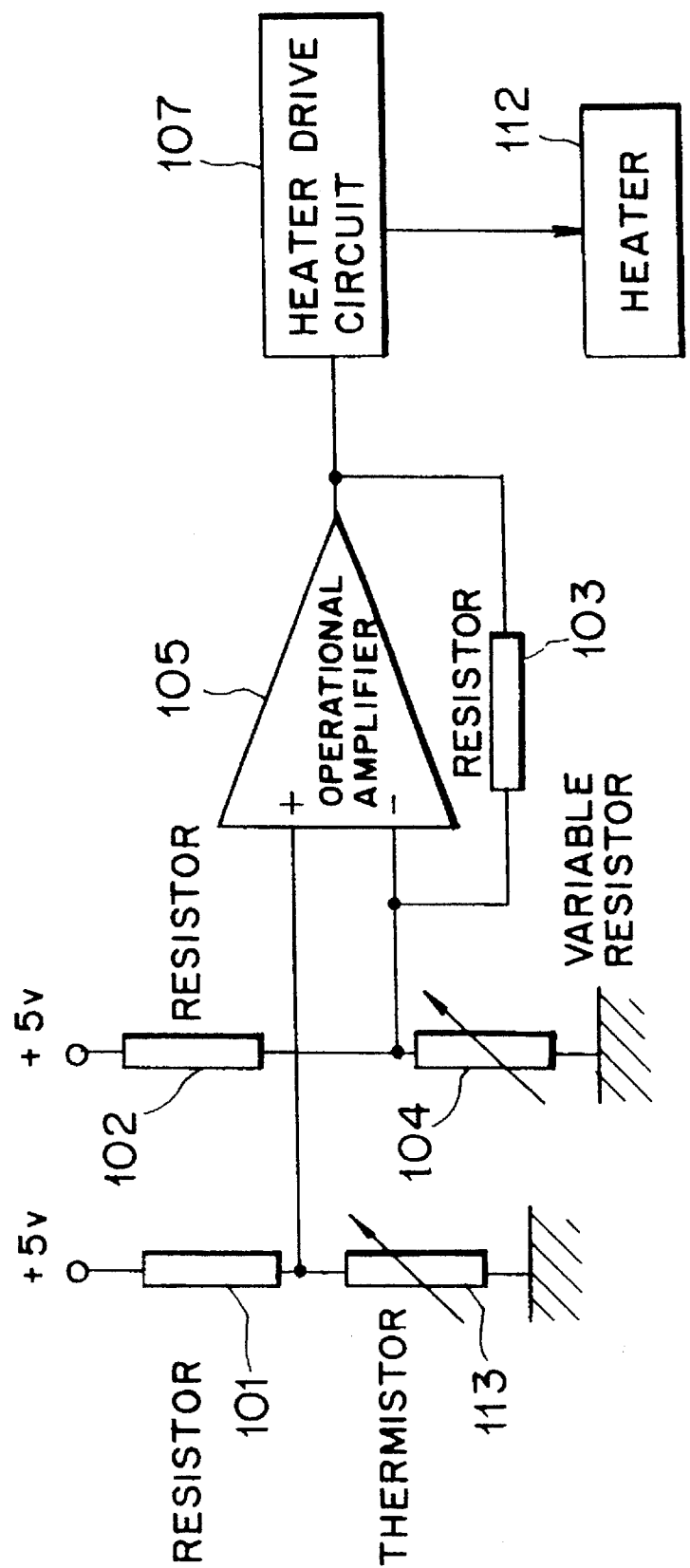
FIG. 14 is a block diagram showing a first example of a control device for a general thermal fixing machine.

The heater drive circuit 22 receives control signals from the CPUs 21a, 21b, 21c and 21d to subject the heater to an on/off control (electric power supply/halt to the heater 112). The heater drive circuit 22 corresponds functionally to the heater drive circuit 107 shown in FIGS. 14 and 15.

Next, explanation will be made below as for an on/off control of the heater 112 of the CPU 21a corresponding to the first embodiment of the present invention, based on a digital value temperature detection value.

Figure 5:
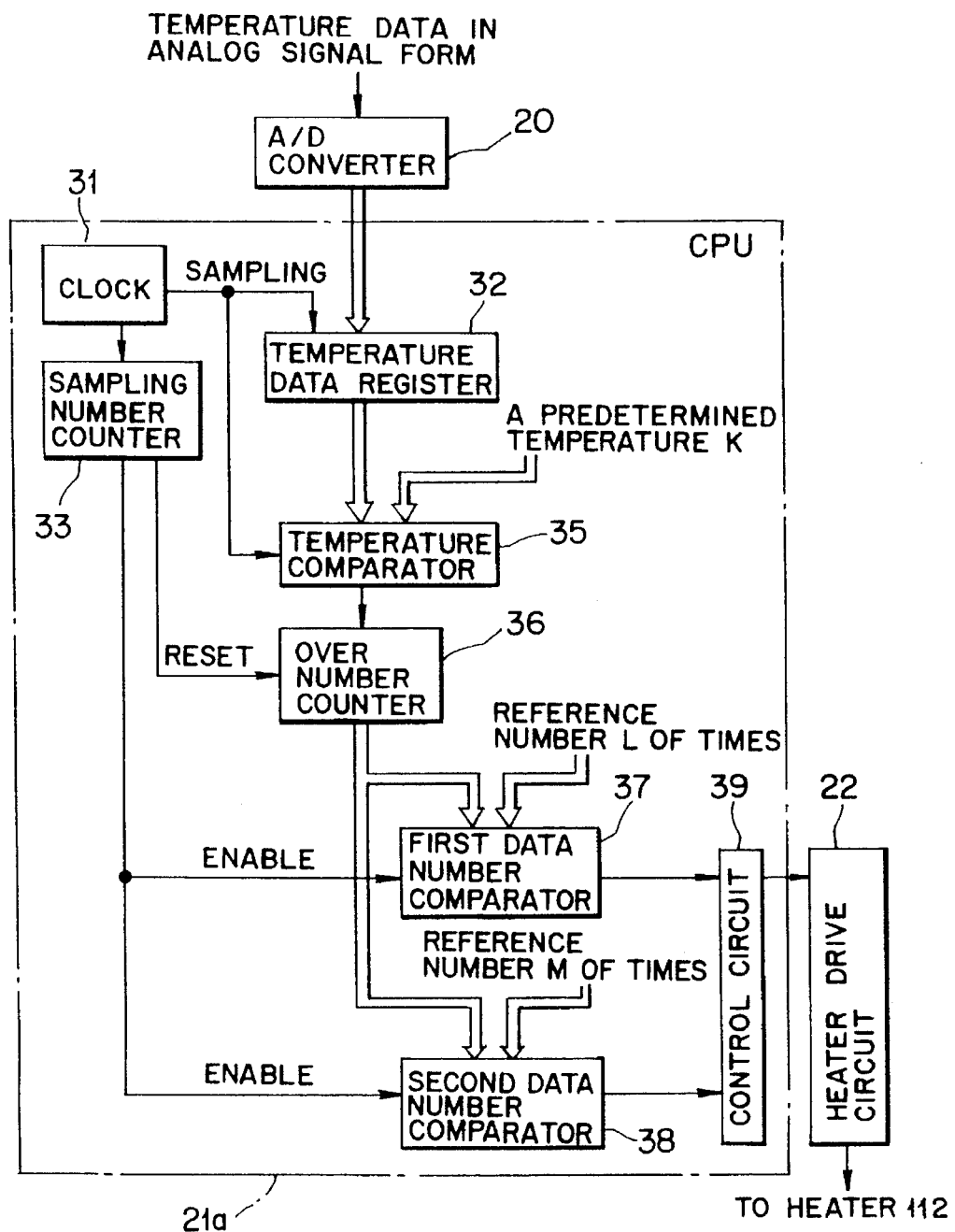
FIG. 5 is a block diagram showing the main portion of the first embodiment of the present invention.

FIG. 5 is a functional block diagram showing a control operation of the CPU 21a being the control device in the thermal fixing machine 17. Referring to FIG. 5, numeral 31 represents a clock oscillator for generating clock signals, for example, every 15 milliseconds, and 32 represents a temperature data register (sampling means). The temperature data register 32 sequentially samples and stores, for example, N digital values as temperature detection values of the thermal fixing machine 17 from the A/D converter 20 in accordance with clock signals from the clock oscillator 31 and then outputs the result to the temperature comparator 35 (to be described later).

The sampling number counter 33 inputs clock signals from the clock oscillator 31 to count a sampling number as a data number of a temperature detection value sampled by the temperature data register 32. When N temperature detection value is sampled, the sampling number counter 33 outputs an enable signal to the first data number comparing means 37 and the second data number comparing means 38 (to be described later) and outputs a reset signal to the over number counter 36 (to be described later).

The temperature comparator 35 receives sequentially N temperature detection values from the temperature data register 32 to compare it with a predetermined temperature K (for example, a fixing temperature of about 140° C.).

The over number counter 36 receives temperature comparison information from the temperature comparator 35 to count a temperature detection value larger than the predetermined temperature K.

The count value information from the over number counter 36 is reset to zero in response to a reset signal from the sampling number counter 33. Then, when the over number counter 36 inputs the temperature comparison information regarding all N temperature detection values from the temperature comparator 35, it outputs the result to the first data number comparator 37 and the second data number comparator 38 in the next stage.

The first data number comparator (first comparing means) 37 receives count value information from the over number counter 36 to compare the count value with a predetermined number L of times (reference number of times, first threshold). The result compared and judged is outputted to the control device (control means) 39.

The second data number comparator (second comparing means) 38 receives count value information from the over number counter 36 to compare the count value with a predetermined number M of times (reference number of times, second threshold) equal to or larger than the predetermined number of times L. The result compared and judged is outputted to the control circuit 39.

The first and second data number comparators 37 and 38 constitute data number comparing means which compares a data number counted by the over number counter 36 with the predetermined thresholds L and M, respectively.

The control circuit 39 receives compared and judged results from the first and second data number comparators 37 and 38 and outputs a control signal to the heater drive circuit 22 based on the compared and judged results. In concrete, when the compared and judged result from the first data comparator 37 is a count number smaller than the predetermined number L of times, the control circuit 39 outputs a control signal which subjects the heater 112 to an on control to the heater drive circuit 22. On the other hand, when the compared and judged result from the second data comparator 38 is a count number larger than the predetermined number M of times, the control circuit 39 outputs a control signal which subjects the heater 112 to an off control to the heater drive circuit 22.

In the comparing and judging operation of the first and second data number comparators 37 and 38, when the count value is within the predetermined number L of times and a predetermined number M of times, the control circuit 39 outputs a control signal which maintains a current on/off control state of the heater 112, to the heater drive circuit 22.

Next, the operation of the control device (CPU 21a) for a fixing machine according to the first embodiment of the present invention will be explained with reference to FIG. 6.

Figure 6:
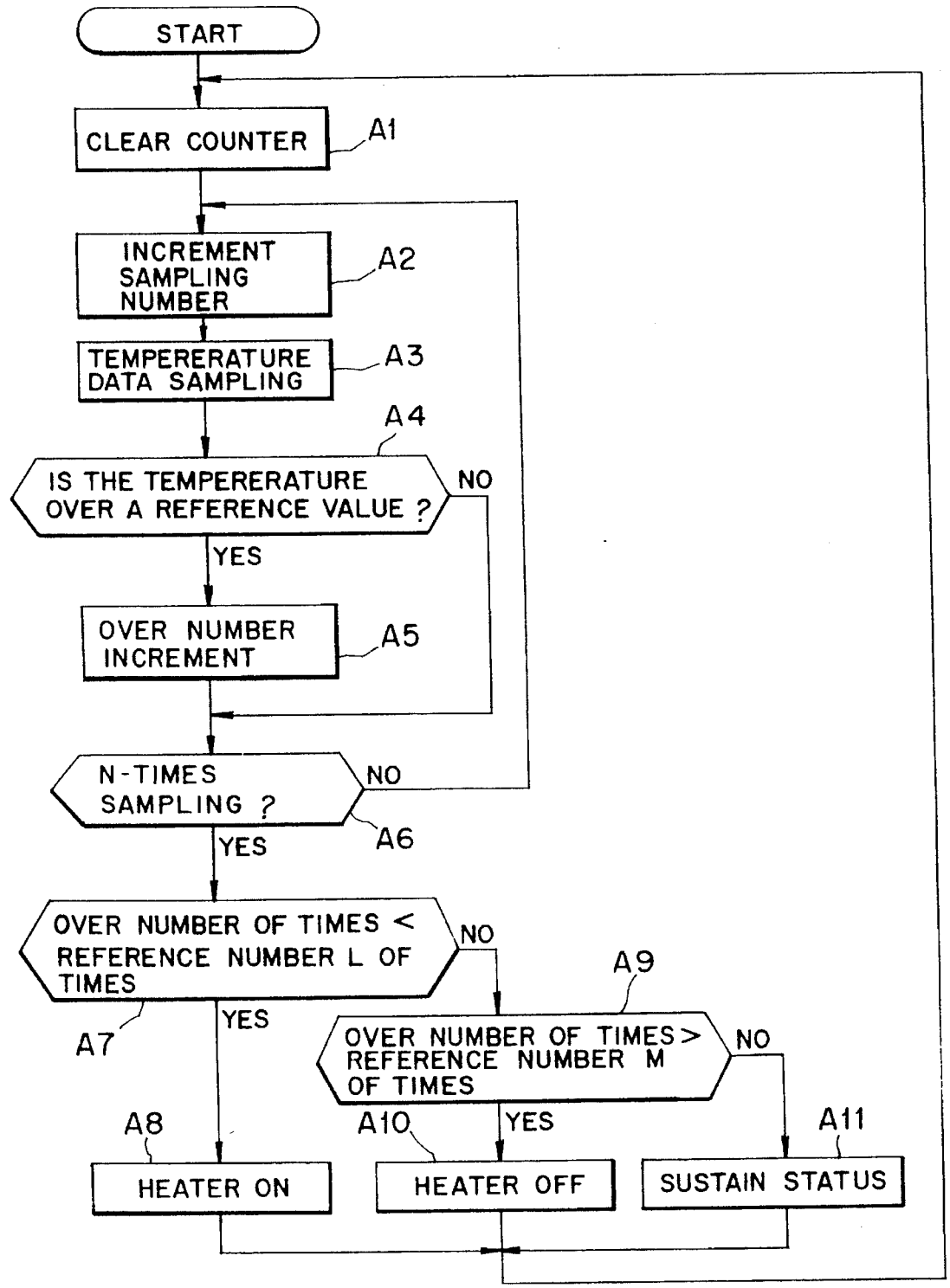
FIG. 6 is a flow chart used for explaining an operation of the first embodiment of the present invention.

As shown in FIG. 6, with the over number counter 36 reset (cleared) in response to a reset signal from the sampling number counter 33 (step A1), when the clock generator 31 produces clock signals, the sampling number counter 33 counts up the number of the temperature detection value sampled (step A2) based on the clock signals. At the same time, the temperature data register 32 samples a temperature detection value (temperature data) from the A/D converter 20 to output it to the temperature comparator 35 (step A3).

The temperature comparator 35 compares N temperature detection values sequentially inputted from the temperature data register 32 with a predetermined temperature K (step A4). When the result is larger than the predetermined temperature K, the over number counter 36 increments its count value by 1 (step A5).

When the temperature comparator 35 has completed the comparing operation to the N temperature detection values (step A6) compared, the first data number comparator 37 receives count value information from the over number counter 36 to compare the count value with the predetermined number L of times, thus outputting the comparison result to the control circuit 39 (step A7).

When a comparison operation in value has not been completed to each of N temperature detection values, the steps A2 to A5 are continuously processed in the step A6.

When the first data number comparator 37 judges that the count value from the over number counter 36 is smaller than the predetermined number L of times, it can be judged that the temperature of the thermal fixing machine 17 has a down-gradient with respect a predetermined temperature. The control circuit 39 produces a control signal for subjecting the heater 112 to an on control to the heater drive circuit 22 (step A8). As a result, electric power is supplied to the heater 112 to turn it on, thus heating the thermal fixing machine 17.

In the step A7, when it is judged that the count value is equal to or larger than the predetermined number L of times, the process goes to the step A9. The second data number comparator 38 compares a count value from the over number counter 36 with the predetermined number M of times equal to or larger than the number L of times and outputs the compared and judged result to the control circuit 39.

In the step A9, when it is judged that the count value is larger than the predetermined number M of times, it can be judged that the temperature of the thermal fixing machine 17 has an up-gradient with respect to the predetermined temperature. The control circuit 39 outputs a control signal for subjecting the heater 112 to an off control to the heater drive circuit 22 (step A10) to cease a power supply to the heater 112, thus cooling naturally the thermal fixing machine 17.

In the step A9, when it is judged that the count value is equal to or less than a predetermined number M of times, or is between the predetermined number L of times and the predetermined number M of times (equal to or larger than L but equal to or smaller than M), the control circuit 39 outputs a control signal for maintaining the current on/off control state of the heater 112 to the heater drive circuit 22 (step A11).

If the sampling number is 5, the reference number L of times is 3 and the reference number M of times is 3, the sampling operation is made five times in the steps A1 to A7 to compare the five temperature detection values with the predetermined temperature K.

When the value of the over number counter 36 is less than 3, the control circuit 39 outputs a control signal for subjecting the heater 112 to an on control to the heater drive circuit 22 to supply electric power to the heater 112 (step A8). When the value of the over number counter 36 is more than 3, the control circuit 39 outputs a control signal for subjecting the heater 112 to an off control to the heater drive circuit 22 to cease electric power to the heater 112 (step A10). When the value of the over number counter 36 is equal to 3, the control circuit 39 controls the heater 112 to maintain the current on/off control state thereof (step A11).

As described above, according to the control device for a thermal fixing machine of the present embodiment, a temperature variation to the predetermined temperature K of the thermal fixing machine 17 is obtained based on plural temperature detection values. An actual temperature is statistically judged to execute an on/off control to the heater 112 so that the resolution of the A/D converter 20 can be improved substantially. There is an advantage in that the fixing temperature can be controlled with higher accuracy without using any high-resolution A/D converters and a toner image can be fixed at a suitable temperature to form a good image.

As described above, since the temperature of the thermal fixing machine 17 can be controlled with higher accuracy, the hysteresis width, which is defined between the heater on threshold L and the heater off threshold M to prevent a heater chattering, can be narrowed. Hence there is an advantage in that a variation in temperature is sufficiently small.

In the case where the first data number comparator 37 compares a count number with a predetermined number L of times or the second data number comparator 38 compares a count number with a predetermined number M of times, there are three aspects in addition to that of the present embodiment.

In the first aspect, when the compared and judged result from the first data number comparator 37 is smaller than the predetermined number L of times, a control signal for subjecting the heater 112 to an on control is outputted to the heater drive circuit 22. When the compared and judged result from the first data number comparator 37 is equal to or larger than the predetermined number M of times, a control signal for subjecting the heater 112 to an off control is outputted to the heater drive circuit 22. When the count value is between the predetermined number L of times and the predetermined number M of times (equal to or more than L but less than M), the control circuit 39 outputs a control signal for maintaining the on/off state of the heater 112 to the heater drive circuit 22.

In the second aspect, when the compared and judged result from the first data number comparator 37 is equal to or smaller than the predetermined number L of times, a control signal for subjecting the heater 112 to an on control is outputted to the heater drive circuit 22. When the compared and judged result from the second data number comparator 38 is larger than the predetermined number M of times, a control signal for subjecting the heater 112 to an off control is outputted to the heater drive circuit 22. When the count value is between the predetermined number L of times and the predetermined number M of times (more than L but equal to or less than M), the control circuit 39 outputs a control signal for maintaining the on/off state of the heater 112 to the heater drive circuit 22.

In the third aspect, when the compared and judged result from the first data number comparator 37 is a count value equal to or smaller than the predetermined number L of times, a control signal for subjecting the heater 112 to an on control is outputted to the heater drive circuit 22. When the compared and judged result from the second data number comparator 38 is larger than the predetermined number M of times, a control signal for subjecting the heater 112 to an off control is outputted to the heater drive circuit 22. When the count value is between the predetermined number L of times and the predetermined number M of times (equal to or more than L but equal to less than M), the control circuit 39 outputs a control signal for maintaining the on/off state of the heater 112 to the heater drive circuit 22.

Needless to say, the three aspects described above can provide the same function and effect as those of the above embodiment.

(c) Explanation of Second Embodiment:

Next the second embodiment according to the present invention will be explained below.

Figure 7:
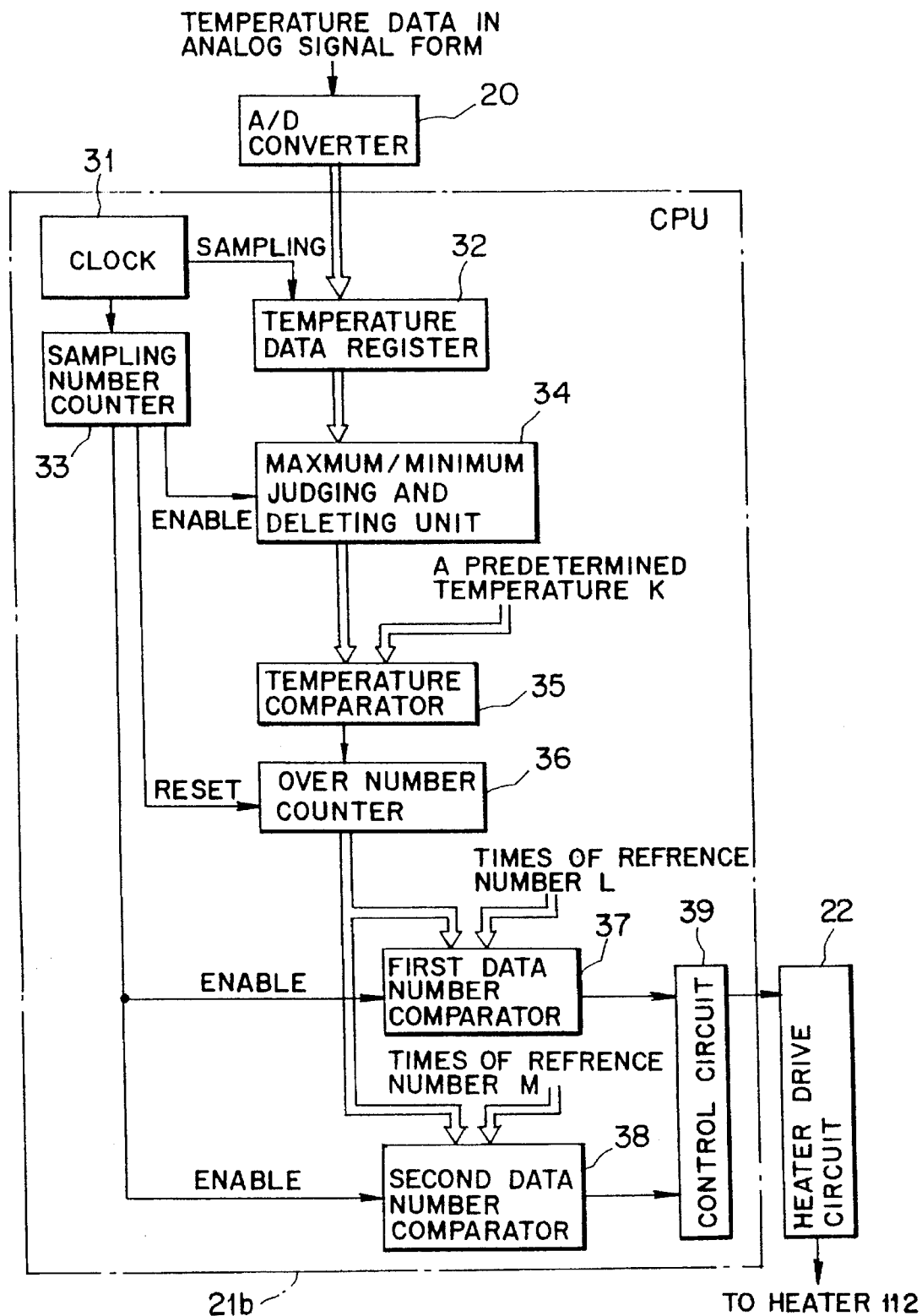
FIG. 7 is a block diagram showing the main portion of the second embodiment of the present invention.

FIG. 7 is a functional diagram showing the control operation of the CPU 21b in the control device for a thermal fixing machine according to the second embodiment of the present invention. The control device for a thermal fixing machine according to the present invention is different from that in the first embodiment in that the CPU 21b, as shown in FIG. 7, includes a maximum/minimum judging and deleting unit (deleting means) 34. Temperature detection values sampled by the temperature data register 32, the temperature detection values being remaining ones obtained by deleting the maximum value and the minimum value from the temperature detection values, are compared with a predetermined temperature K, respectively. The other configuration is fundamentally similar to that in the first embodiment.

Like the first embodiment, the control device for a thermal fixing machine according to the present invention is applied to a thermal fixing machine arranged in an electrophotographic recording apparatus as shown in FIG. 2. The configuration of the control device is shown in FIG. 4.

In the CPU 21b, a clock generator 31, a temperature comparator 35, an over number counter 36, a first data number comparator 37, a second data number comparator 38, and a control circuit 39 correspond functionally to respective elements in the CPU 21a of the first embodiment. Hence the detail explanation will be omitted here.

According to the present embodiment, the temperature data register 32 samples, for example, (N+ 2) digital values each as a temperature detection value of the thermal fixing machine 17 from the A/D converter 20 in response to a clock signal from the clock oscillator 31 to store them temporarily.

The sampling number counter 33 according to the present invention inputs clock signals from the clock oscillator 31 to count a sampling number as data number of a temperature detection value stored in the temperature data register 32. When (N+ 2) temperature detection values are sampled, the sampling number counter 33 outputs an enable signal to the maximum/minimum judging and deleting unit 34, and the first and second data number comparing means 37 and 38, and outputs a reset signal to the over number counter 36.

In response to the enable signal from the sampling number counter 33, the maximum/minimum judging and deleting unit 34 selects the maximum value and the minimum value among (N+ 2) temperature detection values stored in the temperature data register 32 to delete them.

In the present embodiment, the over number counter 36 compares N temperature detection values from the maximum/minimum judging and deleting unit 34 with a predetermined temperature K. An actual temperature is statistically determined based on the result on temperature compared and judged to subject the heater 112 to an on/off control.

Next, the operation of the control device (CPU 21b) for a thermal fixing machine according to the second embodiment of the invention will be explained with reference to FIG. 8.

Figure 8:
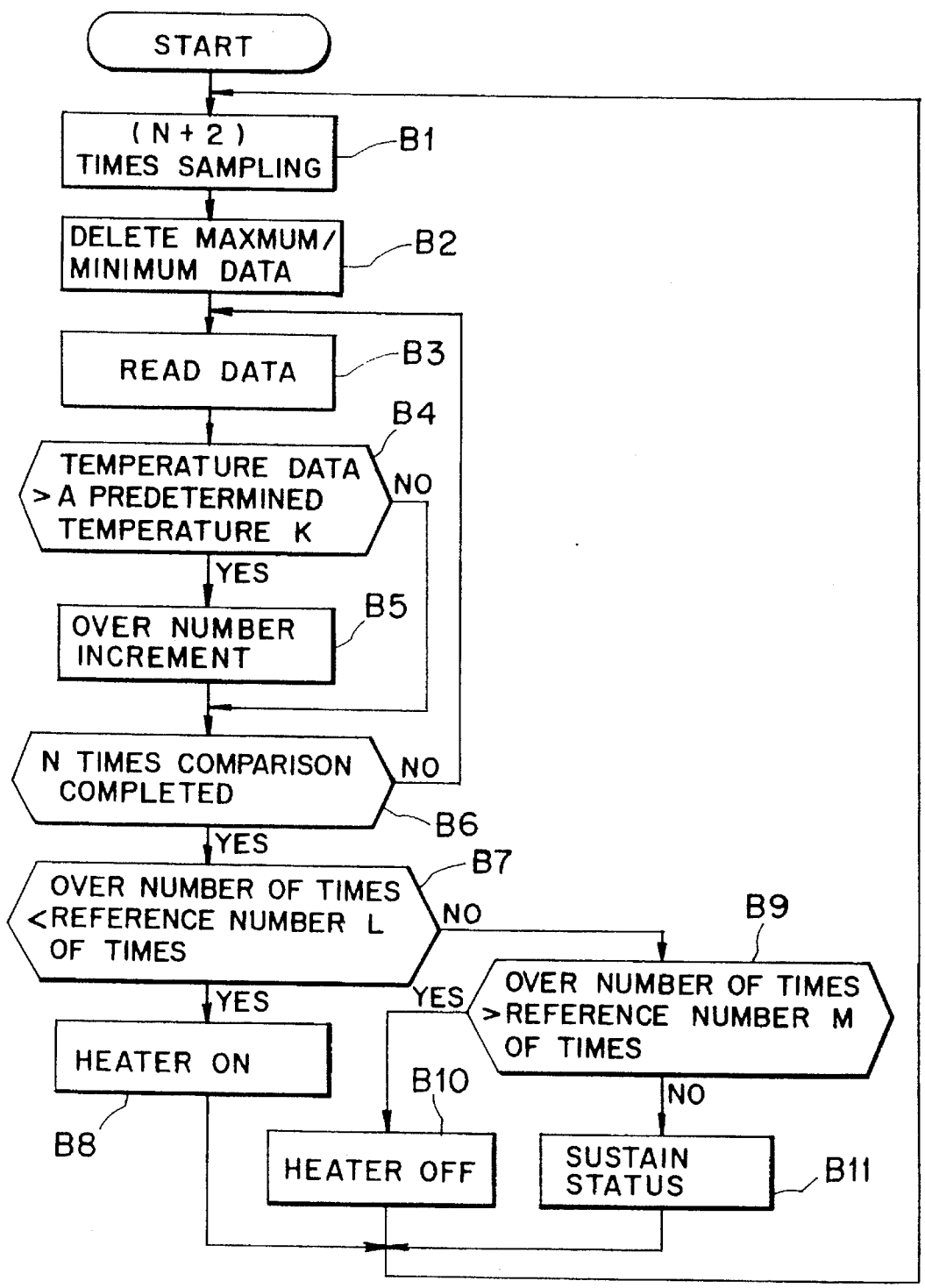
FIG. 8 is a flow chart used for explaining an operation of the second embodiment according to the present invention.

As shown in FIG. 8, the temperature data register 32 first samples (N+ 2) temperature detection values of the thermal fixing machine 17 subjected to a digital conversion from the A/D converter 20 in response to clock signals from the clock oscillator 31 in the step B1 to store them. When (N+ 2) data are sampled, the over number counter 36 is reset to zero in response to the reset signal from the sampling number counter 33 while the sampling number counter 33 outputs an enable signal to the maximum/minimum judging and deleting unit 34, the first and second data number comparators 37 and 38.

The maximum/minimum judging and deleting unit 34 selects the maximum value and the minimum values among (N+2) temperature detection values sampled to delete them (step B2) and outputs the remaining N temperature detection values to the temperature comparator 35 (step B3).

The temperature comparator 35 compares the N temperature detection values inputted from the maximum/minimum judging and deleting unit 34 with the predetermined temperature K (step B4). When the result is larger than the predetermined temperature K, the over number counter 36 increments its count value by 1 (step B5).

When the temperature comparator 35 has completed a comparison operation to N temperature detection values (step B6), the first data number comparator 37 compares count value information from the over number counter 36 with a predetermined number L of times. The result compared and judged is outputted to the control circuit 39 (step B7).

When the comparison operation to the N temperature detection values has not been completed, the steps B3 to B5 are continuously processed in the step B6.

In the case where the first data number comparator 37 judged that the count values is smaller than a predetermined number L of times, the control circuit 39 produces a control signal for subjecting the heater 112 to an on control to the heater drive circuit 22 (step B8).

In the step B7, when it is judged that a count value is larger than the predetermined number L of times, the process goes to the step B9. Then the second data number comparator 38 compares a count value from the over number counter 36 with a predetermined number M of times equal to or more than the predetermined number L of times to output the result compared and judged to the control circuit 39.

In the step B9, when it is judged that a count value is larger than a predetermined number M of times, the second data number comparator 38 produces a control signal for subjecting the heater 112 to an off control to the heater drive circuit 22 (step B10). When it is judged that a count value is equal to or smaller than a predetermined number M of times, or the count value is between the predetermined number L of times and the predetermined number M of times, the control circuit 39 controls the heater drive circuit 22 to maintain the current on/off control state of the heater 112 (step B11).

As described above, the control device for a thermal fixing machine according to the present invention provides the same function and effect as those in the first embodiment. In the second embodiment, since the maximum/minimum judging and deleting unit 34 deletes the maximum value and the minimum value among temperature detection values sampled, it can be eliminated that the A/D converter 20 outputs abnormal data due to noises induced in the thermistor 113 and circuits can be removed. Hence, there is an advantage in that an influence due to noise interference can be released so that the temperature of the thermal fixing machine 17 can be controlled with high accuracy.

In the present invention, the maximum/minimum judging and deleting unit 34 deletes only the maximum value and the minimum value among data. However, according to the present invention, plural specific data in addition to the maximum value and the minimum value may be deleted.

The first data number comparator 37 compares a count value with a predetermined number L of times and the second data number comparator 38 compares a count value with a predetermined number M of times. In the comparison operation, the present embodiment also has three aspects described in the first embodiment.

(d) Explanation of Third Embodiment:

Explanation will be made below as for the third embodiment of the present invention.

Figure 9:
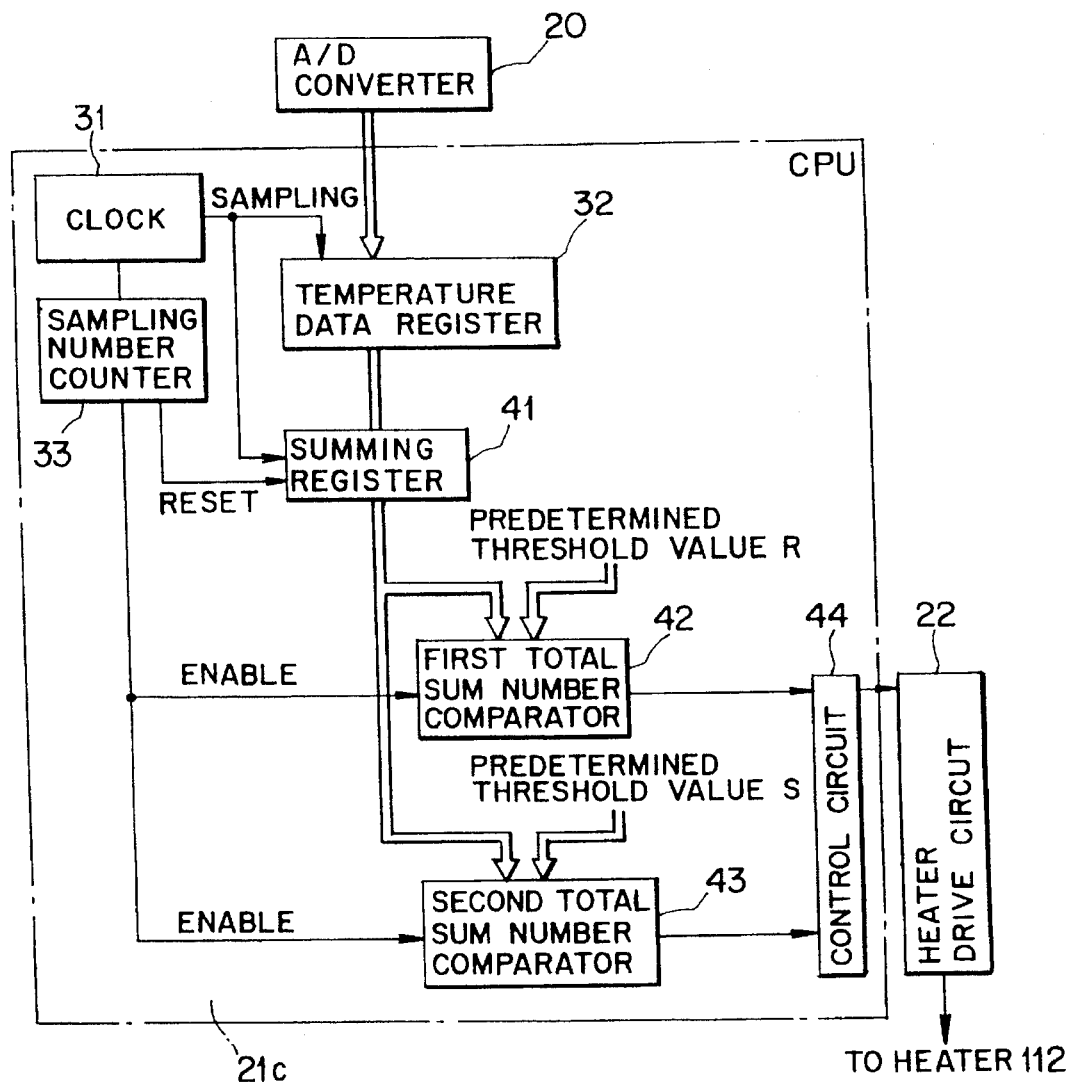
FIG. 9 is a block diagram showing the main portion of the third embodiment.

FIG. 9 is a functional block diagram showing the control operation of the CPU 21c in the control device for a thermal fixing machine according to the third embodiment of the present invention. In the control device for a fixing machine according to the present embodiment, the CPU 21c, shown in FIG. 9, includes a summing register 41, a first total sum comparator 42, a second total sum comparator 43 and a control circuit 44, in addition to the clock oscillator 31 similar to that in the first embodiment, the temperature data register 32 and the sampling number counter 33.

Like the first embodiment, the control device of a thermal fixing machine according to the present embodiment can be applied to the thermal fixing machine mounted on the electrophotographic recording apparatus shown in FIG. 2. The general structure is shown in FIG. 4.

The sampling number counter 33 according to the present embodiment counts a sampling number as a data number stored in the temperature data register 32, like the first embodiment described above. However, when N temperature detection values are sampled, the sampling number counter 33 outputs an enable signal to the first and second total sum comparators 42 and 43 and outputs a reset signal to the summing register 41.

The summing register (total sum calculating means) 41 calculates a total sum of N temperature detection values from the temperature data register 32.

Moreover, the first total sum comparator (first comparing means) 42 inputs a total sum from the summing register 41 to compare the total sum with a predetermined threshold (first threshold) R. The result compared and judged is outputted to the control circuit 44.

The second total sum comparator (second comparing means) 43 inputs a total sum from the summing register 41 to compare the total sum with a predetermined threshold (second threshold) S equal to or larger than the predetermined threshold R. The result compared and judged is outputted to the control circuit 44.

The first and second total sum comparators 42 and 43 constitute a total sum comparing means which compares a total sum calculated by the summing register 41 with predetermined thresholds R and S, respectively.

In the first and second total sum comparators 42 and 43 of the present embodiment, each of the predetermined thresholds R and S equals substantially to a value being the sampling number 16 of times multiplied by a value from the A/D converter 20 in the case of the heat roller 111 at a predetermined temperature. Thus, a suitable hysteresis width is set by making a difference between the threshold R for a heater-on judgment and the threshold S for a heater-off judgment.

When the result compared and judged from the first total sum comparator 42 is smaller than the threshold value R, the control circuit (control means) 44 outputs a control signal for subjecting the heater 112 to an on control to the heater drive circuit 22. When the result compared and judged from the second total sum comparator 43 is larger than the threshold value S, the control circuit (control means) 44 outputs a control signal for subjecting the heater 112 to an off control to the heater drive circuit 22.

When the result compared and judged by the first and second total sum comparators 42 and 43 shows that the total sum is between the predetermined threshold R and the predetermined threshold S, the control circuit 44 outputs a control signal for maintaining the on/off control state of the current heater 112 to the heater drive circuit 22.

Next, explanation will be made as for the operation of the control device (CPU 21c) suitable for a thermal fixing machine according to the third embodiment of the present invention.

Figure 10:
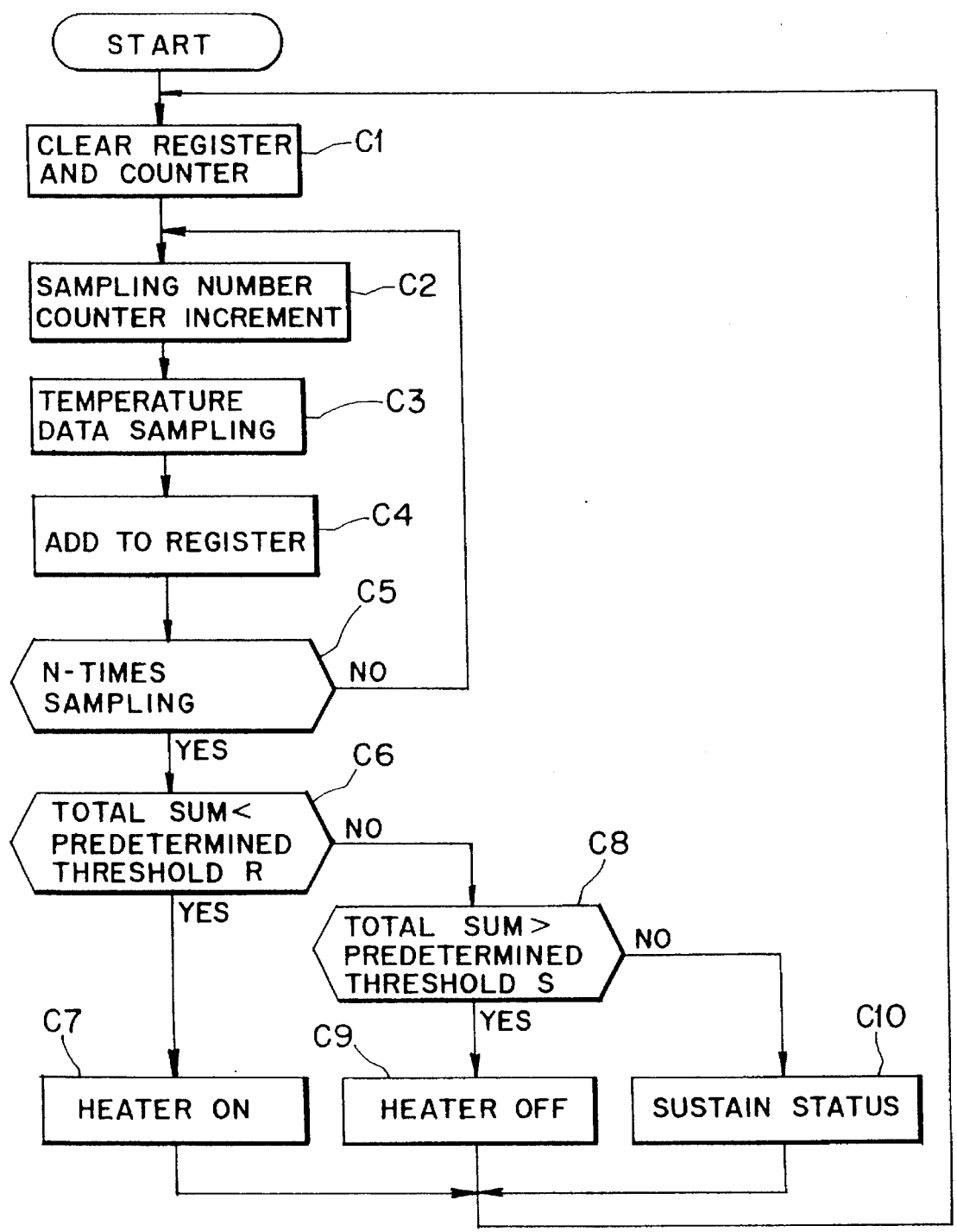
FIG. 10 is a flow chart used for explaining an operation of the third embodiment according to the present invention.

As shown in FIG. 10, with the summing register 41 reset in response to a reset signal from the sampling number counter 33 (step C1), when the clock oscillator 31 produces clock signals, the sampling number counter 33 counts up the number of sampled temperature detection values based on the clock signals (step C2) while the temperature data register 32 samples the temperature detection values (temperature data) from the A/D converter 20 to output the result to the summing register 41 (step C3).

The summing register 41 adds sequentially temperature detection values sampled by the temperature data register 32 in accordance with clock signals from the clock oscillator 31 (step C4). Then, when N temperature detection values have been completely added (step C5), the summing register 41 outputs the total sum to the first and second total sum comparators 42 and 43.

The first total sum comparator 42 compares a total sum from the summing register 41 with a predetermined threshold R (step C6). When the result compared and judged is smaller than the threshold R, it is judged that the temperature of the thermal fixing machine 17 has a down-gradient with respect to the predetermined temperature. The control circuit 44 outputs a control signal for subjecting the heater 112 to an on control to the heater drive circuit 22 (step C7) to supply electric power to the heater 112. Thus, the heater 112 is powered on to heat the thermal fixing machine 17.

In the step C6, when the total sum is equal to or larger than the predetermined threshold R, the second total sum comparator 43 compares a total sum from the summing register 41 with the predetermined threshold S (step C8) to output the result compared and judged to the control circuit 44.

With the result compared and judged from the second total sum comparator 43 larger than the predetermined threshold S, it is judged that the temperature of the thermal fixing machine 17 has an up-gradient with respect to the predetermined temperature. The control circuit 44 outputs a control signal for subjecting the heater 112 to an off control to the heat drive circuit 22 (step C9) to cease an electric power supply to the heater 112. Thus the heater 112 is powered off to cool naturally the thermal fixing machine 17.

Furthermore, in the step C8, when it is judged that the total sum is equal to or less than a predetermined threshold S, or the total sum is between the predetermined threshold R and the predetermined threshold S, the control circuit 44 outputs a control signal for maintaining the on/off control of the current heater 112 to the heater drive circuit 22 (step C10).

According to the control device for a thermal fixing machine in the present embodiment, a total sum is calculated based on plural temperature detection values to compare the total sum with the predetermined threshold values R and S. Since an actual temperature can be judged statistically to subject the heater 112 to an on/off control, the control device can provide the same function and effect as that in the first embodiment.

In the case where the first and second total sum comparators 42 and 43 compare the total sum with the predetermined threshold values R and S, respectively, the present embodiment has three aspects shown in the first embodiment where the total sum is compared with a count number, a predetermined number L of times, or a predetermined number M of times.

(e) Explanation of Fourth Embodiment:

Next, the fourth embodiment according to the present invention will be explained below.

Figure 11:
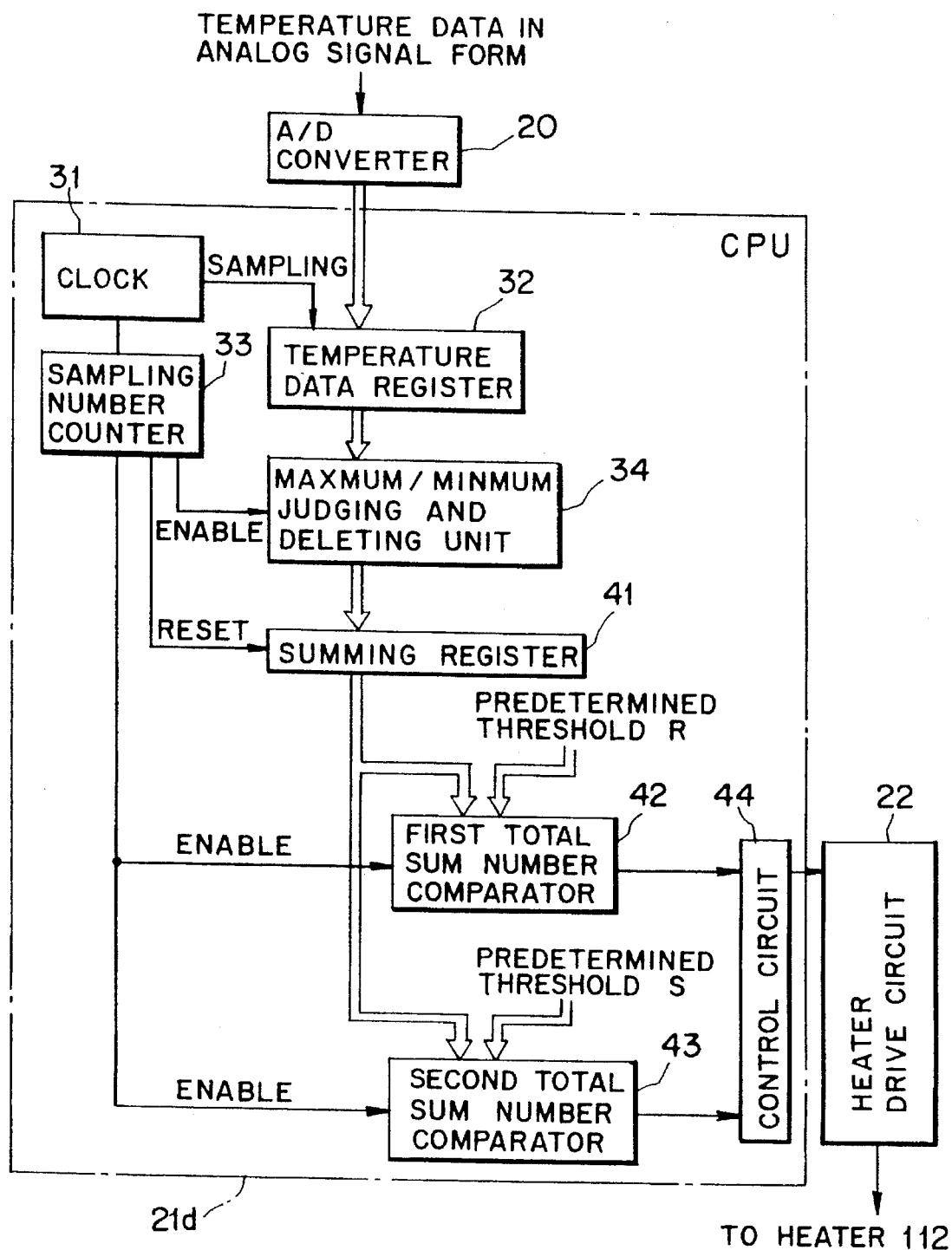
FIG. 11 is a block diagram showing the main portion of the fourth embodiment according to the present invention.

FIG. 11 is a functional block diagram showing the control operation of the CPU 21d arranged in the control device for a thermal fixing machine of the fourth embodiment of the present invention.

According to the present embodiment, the control device for a thermal fixing machine is different from the third embodiment in that the CPU 21d, as shown in FIG. 11, includes the maximum/minimum judging and deleting unit (deleting means) 34 for deleting the maximum value and the minimum value among temperature detection values sampled by the temperature data register 32, and the summing register 41 for calculating a total sum of the remaining temperature detection values. The other elements are substantially similar to those in the third embodiment.

Like the third embodiment, the control device for a thermal fixing machine according to the present embodiment can be applied to a thermal fixing machine arranged in the electrophotographic recording apparatus shown in FIG. 2. The general configuration is shown in FIG. 4.

The clock oscillator 31, the summing register 41, the first total sum comparator 42 and the second total sum comparator 43 have fundamentally the same functions as those in the CPU 21c in the third embodiment. Here, the detail explanation will be omitted.

In the present embodiment, the temperature data register 32 samples, for example (N+ 2) digital values each as the temperature detection value of the thermal fixing machine 17 from the A/D converter 20 in accordance with clock signals from the clock oscillator 31 to store them temporarily.

The sampling number counter 33 inputs clock signals from the clock oscillator 31 to count sampling numbers as data numbers of the thermal detection value stored in the temperature data register 32. When the (N+ 2) temperature detection value is sampled, the sampling number counter 33 also outputs an enable signal to the maximum/minimum judging and deleting unit 34, the first and second total sum comparing means 42 and 43 and outputs a reset signal to the summing register 41.

In response to an enable signal from the sampling number counter 33, the maximum/minimum judging and deleting means 34 selects the maximum value and the minimum value among the (N+ 2) temperature detection values stored in the temperature data register 32 to delete them, and outputs sequentially the remaining N temperature detection values to the summing register 41.

Hence, according to the present embodiment, the summing register 41 calculates a total sum of N temperature detection values from the maximum/minimum judging and deleting unit 34 to judge statistically an actual temperature in accordance with the result compared and judged between the total sum and the sum of the predetermined thresholds R and S, whereby the heater 112 is subjected to an on/off control.

Next, explanation will be made below as for the operation of the control device (CPU 21d) for a thermal fixing machine according to the fourth embodiment of the present invention with reference to the flow chart shown in FIG. 12.

Figure 12:
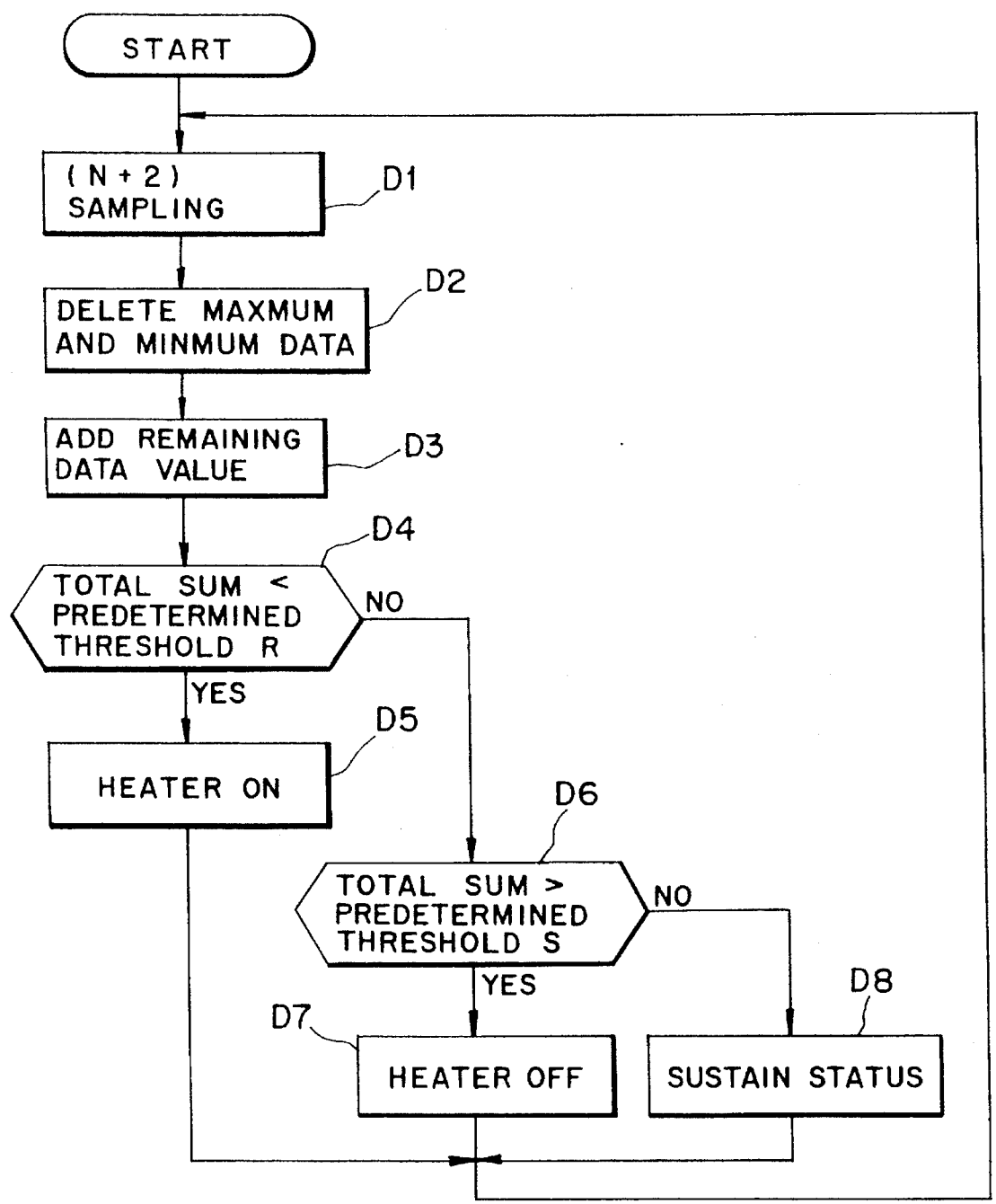
FIG. 12 is a flow chart used for explaining an operation of the fourth embodiment of the present invention.

As shown in FIG. 12, in the step D1, the temperature data register 32 samples (N+ 2) temperature detection values of the thermal fixing machine 17 a/d converted by the A/D converter 20 in response to clock signals from the clock oscillator 31 to store them. When (N+2) data are sampled, the sampling number counter 33 outputs a reset signal to reset the summing register 41 and outputs an enable signal to the maximum/minimum judging and deleting unit 34 and the first and second total sum comparing means 42 and 43.

The maximum/minimum judging and deleting unit 34 selects the maximum/minimum (N+2) temperature detection values sampled to delete them (step D2), and outputs the remaining N temperature detection values to the summing register 41.

The summing register 41 calculates a total sum of N temperature detection values inputted from the maximum/ minimum judging and deleting unit 34 (step D3) and outputs the total sum information to the first and second total sum comparators 42 and 43.

The first total sum comparator 42 compares a total sum from the summing register 41 with a predetermined threshold R (step D4). When the result compared and judged is smaller than the threshold R, the control circuit 44 outputs a control signal for subjecting the heater 112 to an on control to the heater drive circuit 22 (step D5).

In the step D4, when it is judged that the total sum is equal to or more than the threshold R, the second total sum comparator 43 compares the total sum from the summing register 41 with the predetermined threshold S equal to or larger than the threshold R (step D6).

When the result compared and judged from the second total sum comparator 43 is larger than the predetermined threshold S, the control circuit 44 outputs a control signal for subjecting the heater 112 to an off control to the heater 112 (step D7). When the total sum is less than the predetermined threshold S in the step D6, or the total sum is between the predetermined threshold R and the predetermined threshold S, the control circuit 44 outputs a control signal for maintaining an on/off control of the heater 112, to the drive circuit 22 (step D8).

As described above, the control device for a thermal fixing machine of the present embodiment has the same function and effect as that in the third embodiment. In the fourth embodiment, the maximum/minimum judging and deleting unit 34 deletes the maximum value and the minimum value among temperature detection values sampled, it can be prevented that the A/D converter 20 may output abnormal output data due to noises induced in the thermistor 113 and circuits. Therefore, there is an advantage in that less influence due to induced noises results in a temperature control with higher accuracy to the thermal fixing machine 17.

In the case where the first and second total sum comparators; 42 and 43 compare the total sum with the predetermined threshold values R and S, respectively, the present embodiment has three aspects shown in the first embodiment where the total sum is compared with a count number, a predetermined number L of times, or a predetermined number M of times.

In the above embodiments, many sampling numbers can be actually in a range that the power on/off period is not crucial to a temperature of the heater 112.

The case where the sampling period is 15 milliseconds has been explained in the above embodiments. However, the present invention should not be limited to the above condition. The sampling period may be set to a shorter range which is allowable to the processing time of the A/D converter 20 and the CPUs 21a to 21d.

What is claimed is:

1. A method for controlling a thermal fixing machine at a temperature wherein a toner image transferred on a recording medium is heated and melted by means of a heater to fix said toner image on said recording medium, comprising the steps of:

repetitively detecting a temperature of said thermal fixing machine and outputting a digital value representative of the last detected temperature;

repetitively sampling said output digital value to obtain a plurality of temperature detection values; and subjecting said heater to on/off operations, each individual on/off operation based on said plurality of temperature detection values sampled.

2. A thermal fixing machine controlling method according to claim 1, further comprising the steps of:

calculating a data number equal to the number of temperature detection values of said plurality of temperature detection values equal to or greater than a predetermined temperature value among said plurality of temperature detection values; and subjecting said heater to an individual on/off operation based on a comparison of said data number with a predetermined range.

3. A thermal fixing machine controlling method according to claim 2, further comprising the steps of:

setting as said predetermined range a first threshold and a second threshold equal to or larger than said first threshold;

comparing said data number with said first threshold and said second threshold, respectively;

subjecting said heater to an operation when said data number is equal to or smaller than said first threshold; and subjecting said heater to an off operation when said data number is equal to or larger than said second threshold.

4. A thermal fixing machine controlling method according to claim 3, further comprising the step of maintaining an on/off control state of said heater when said data number is between said first threshold and said second threshold.

5. A thermal fixing machine controlling method according to claim 1, further comprising the steps of:

calculating a data number equal to the number of temperature detection values of said plurality of detection values equal to or less than a predetermined temperature value; and subjecting said heater to an on/off operation based on a comparison of said data number with a predetermined range.

6. A thermal fixing machine controlling method according to claim 5, further comprising the steps of:

setting as said predetermined range a first threshold and a second threshold equal to or lower than said first threshold;

comparing said data number with said first threshold and said second threshold, respectively;

subjecting said heater to an on operation when said data number is equal to or larger than said first threshold; and subjecting said heater to an off operation when said data number is equal to or smaller than said second threshold.

7. A thermal fixing machine controlling method according to claim 6, further comprising the step of maintaining an on/off control state of said heater when said data number is between said first threshold and said second threshold.

8. A thermal fixing machine controlling method according to claim 1, further comprising the step of:

calculating a total sum of said plurality of temperature detection values;

comparing said total sum with a predetermined range; and subjecting said heater to an on/off operation based on said comparison.

9. A thermal fixing machine controlling method according to claim 8, further comprising the steps of:

setting as said predetermined range a first threshold and a second threshold equal to or larger than said first threshold;

comparing said total sum with said first threshold and said second threshold, respectively;

subjecting said heater to an on operation when said total sum is equal to or smaller than said first threshold; and subjecting said heater to an off operation when said total sum is equal to or larger than said second threshold.

10. A thermal fixing machine controlling method according to claim 9, further comprising the step of maintaining an on/off control state of said heater when said total sum is between said first threshold and said second threshold.

11. A thermal fixing machine controlling method according to any one of claims 1 to 10, further comprising the step of subjecting said heater to an on/off operation based on temperature detection values other than at least one temperature detection value in decreasing order from the largest one among said plurality of temperature detection values.

12. A thermal fixing machine controlling method according to any one of claims 1 to 10, further comprising the step of subjecting said heater to an on/off operation based on temperature values other than at least one temperature detection value in increasing order from the smallest one among said plurality temperature detection values.

13. A thermal fixing machine controlling method according to any one of claims 1 to 10, further comprising the step of:

subjecting said heater to an on/off operation based on temperature values other than at least one temperature detection value in decreasing order from the largest one among said plurality of temperature detection values; and subjecting said heater to an on/off operation based on temperature values other than at least one temperature detection value in increasing order from the smallest one among said plurality of temperature detection values.

14. A device for controlling a thermal fixing machine at a temperature wherein a toner image transferred on a recording medium is heated and melted by means of a heater to fix said toner image on said recording medium, comprising:

temperature detecting means for repetitively detecting a temperature of said thermal fixing machine and outputting a digital value representative of the last detected temperature;

sampling means for repetitively sampling said output digital value to obtain a plurality of temperature detection values; and control means for subjecting said heater to on/off operations, each individual on/off operation based on said plurality of temperature detection values sampled by said sampling means.

15. A thermal fixing machine controlling device according to claim 14, further comprising:

temperature comparing means for comparing each of said plurality of temperature detection values with a predetermined temperature value, respectively;

counting means for calculating a data number equal to the number of temperature detection values equal to or greater than the predetermined temperature value based on the comparison of said temperature comparing means; and data number comparing means for comparing said data number counted by said counting means with a predetermined range;

whereby said control means subjects said heater to an on/off operation based on the comparison of said data number comparing means.

16. A thermal fixing machine controlling device according to claim 15, wherein said data number comparing means comprises:

first comparing means for comparing said data number with a first threshold; and second comparing means for comparing said data number with a second threshold equal to or larger than said first threshold;

whereby said control means subjects said heater to an on operation when said first comparing means judges that said data number is equal to or smaller than said first threshold; and said second comparing means subjects said heater to an off operation when said data number is equal to or larger than said second threshold.

17. A thermal fixing machine controlling device according to claim 16, wherein said control means maintains an on/off control state of said heater when said first comparing means and said second comparing means judge that said data number is between said first threshold and said second threshold.

18. A thermal fixing machine controlling device according to claim 14, further comprising:

temperature comparing means for comparing each of said plurality of temperature detection values with a predetermined temperature value, respectively;

counting means for calculating a data number equal to a number of temperature detection values equal to or less than the predetermined temperature value based on the comparison of said temperature comparing means; and data number comparing means for comparing the data number counted by said counting means with a predetermined data threshold range;

whereby said control means subjects said heater to an on/off operation based on the comparison of said data number comparing means.

19. A thermal fixing machine controlling device according to claim 18, wherein said data number comparing means comprises:

first comparing means for comparing said data number with a first threshold; and second comparing means for comparing said data number with a second threshold equal to or smaller than said first threshold;

whereby said control means subjects said heater to an on operation when said first comparing means judges that said data number is equal to or larger than said first threshold; and said second comparing means subjects said heater to an off operation when said data number is equal to or smaller than said second threshold.

20. A thermal fixing machine controlling device according to claim 19, wherein said control means maintains an on/off control state of said heater when said first comparing means and said second comparing means judge that said data number is between said first threshold and said second threshold.

21. A thermal fixing machine controlling device according to claim 14, further comprising:

total sum calculating means for calculating a total sum of said plurality of temperature detection values; and total sum comparing means for comparing said total sum with a predetermined range;

whereby said control means subjects said heater to an on/off operation based on the comparison of said total sum comparing means.

22. A thermal fixing machine controlling device according to claim 21, said total sum comparing means comprises:

first comparing means for comparing said total sum with a first threshold; and second comparing means for comparing said total sum with a second threshold equal to or larger than said first threshold;

whereby said control means subjects said heater to an on operation when said first comparing means judges that said total sum is equal to or smaller than said first threshold, and said control means subjects said heater to an off operation when said second comparing means judges that said total sum is equal to or larger than said second threshold.

23. A thermal fixing machine controlling device according to claim 22, wherein said control means maintains an on/off control state of said heater when both said first comparing means and said second comparing means judge that said total sum is between said first threshold and said second threshold.

24. A thermal fixing machine controlling device according to any one of claims 14 to 23, further comprising deleting means for deleting at least one temperature detection value in decreasing order from the maximum one among said plurality of temperature detection values sampled by said sampling means.

25. A thermal fixing machine controlling device according to any one of claims 14 to 23, further comprising deleting means for deleting at least one temperature detection value in increasing order from the minimum one among said plurality of temperature detection values sampled by said sampling means.

26. A thermal fixing machine controlling device according to any one of claims 14 to 23, further comprising deleting means for deleting at least one temperature detection value in decreasing order from the maximum one among said plurality of temperature detection values sampled by said sampling means and for deleting at least one temperature detection value in increasing order from the minimum one among said plurality of temperature detection values sampled by said sampling means.

* * * * *